(12) United States Patent
Nucci

(10) Patent No.: US 7,684,320 B1
(45) Date of Patent: Mar. 23, 2010

(54) METHOD FOR REAL TIME NETWORK TRAFFIC CLASSIFICATION

(75) Inventor: Antonio Nucci, Burlingame, CA (US)

(73) Assignee: Narus, Inc., Sunnyvale, CA (US)

( * ) Notice: Subject to any disclaimer, the term of this patent is extended or adjusted under 35 U.S.C. 154(b) by 566 days.

(21) Appl. No.: 11/644,419

(22) Filed: Dec. 22, 2006

(51) Int. Cl.
*G01R 31/08* (2006.01)
*H04L 1/00* (2006.01)

(52) U.S. Cl. .................................... 370/229
(58) Field of Classification Search ............ 370/229, 370/232
See application file for complete search history.

(56) References Cited

U.S. PATENT DOCUMENTS

| | | | | |
|---|---|---|---|---|
| 5,583,792 | A * | 12/1996 | Li et al. ............... | 709/224 |
| 6,003,029 | A * | 12/1999 | Agrawal et al. ........ | 707/7 |
| 6,124,816 | A * | 9/2000 | Lee et al. ............... | 341/144 |
| 6,363,429 | B1 * | 3/2002 | Ketcham ............... | 709/235 |
| 6,457,051 | B1 * | 9/2002 | Riddle et al. .......... | 709/224 |
| 6,668,333 | B1 * | 12/2003 | Demir et al. .......... | 713/500 |
| 2003/0065509 | A1 * | 4/2003 | Walker .................. | 704/228 |
| 2005/0238238 | A1 * | 10/2005 | Xu et al. ............... | 382/224 |
| 2006/0008151 | A1 * | 1/2006 | Lin et al. .............. | 382/190 |

OTHER PUBLICATIONS

Karagiannis, T., et al., "BLINC: Multilevel Traffic Classification in the Dark", in: Proceedings of the 2005 conference on Applications, Technologies, Architectures, and Protocols for Computer Communications (Aug. 22-26, 2005), pp. 229-240.

Dewes, C., et al., "An Analysis of Internet Chat Systems," in: Proceedings of the 3rd ACM SIGCOMM Conference on Internet Measurement (Aug. 27-29, 2003), pp. 51-64.

Karagiannis, T., et al., "Transport Layer Identification of P2P Traffic", in: Proc. of the 4th ACM SIGCOMM Conference on Internet Measurement (Oct 25-27, 2004), pp. 121-134.

Roughan, M., et al., "Class-of-Service Mapping for QoS: A Statistical Signature-based Approach to IP Traffic Classification," in: Proceedings of the 4th ACM SIGCOMM Conference on Internet Measurement (Oct. 25-27, 2004), pp. 135-148.

* cited by examiner

*Primary Examiner*—Derrick W Ferris
*Assistant Examiner*—Angel Brockman
(74) *Attorney, Agent, or Firm*—Fernandez & Associates, LLP

(57) ABSTRACT

A method is provided to classify network traffic flows in real-time using spectral analysis techniques to extract regularities inside the network traffic flows. In one embodiment of the invention, subspace decomposition on power spectral density feature vectors and minimum coding length criterion are utilized for training traffic flows of different classifications. Experimental results are shown to demonstrate the effectiveness and robustness of the invention.

16 Claims, 21 Drawing Sheets

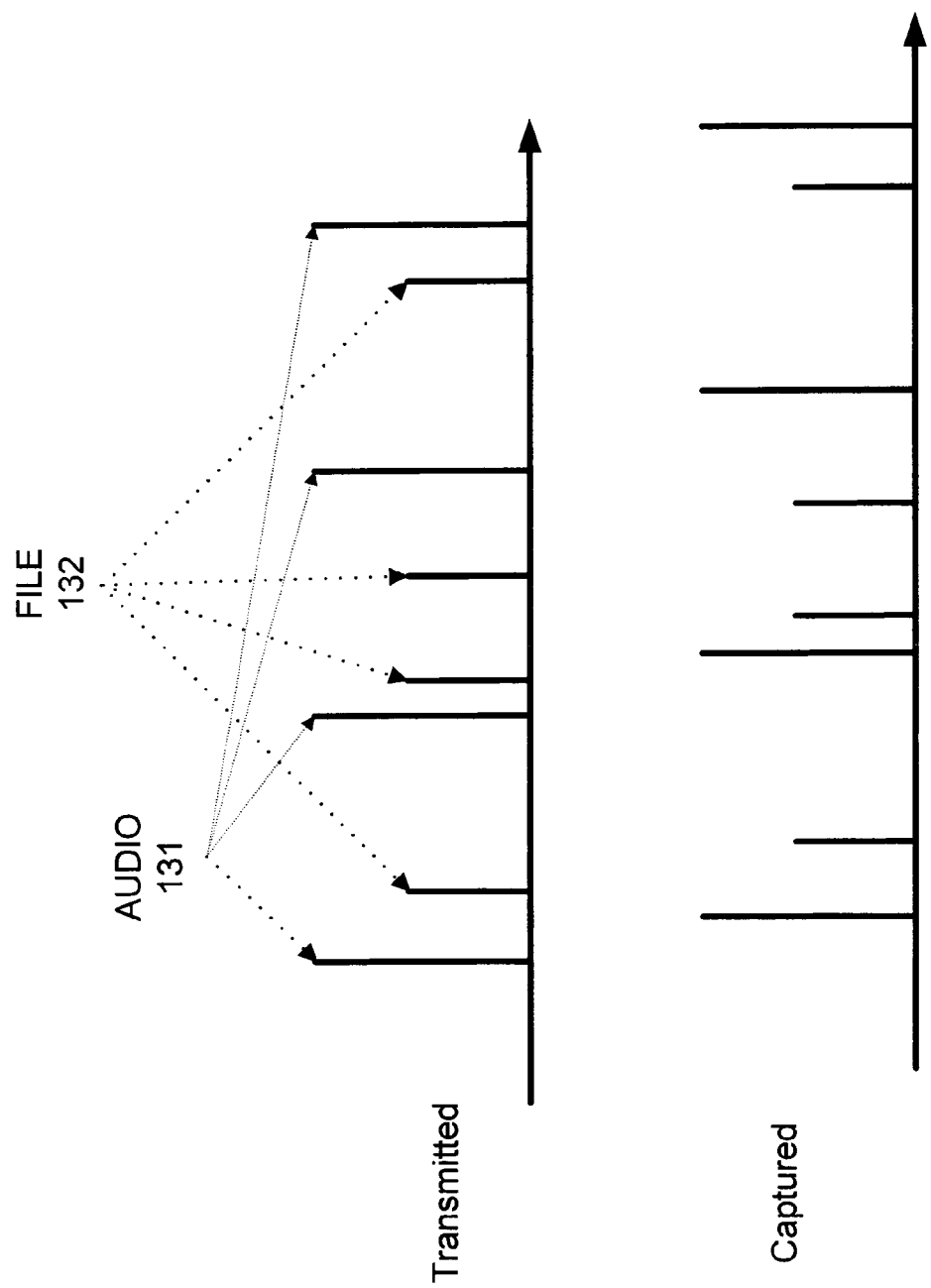

METHOD FOR REAL TIME NETWORK TRAFFIC CLASSIFICATION

BACKGROUND

1. Field

The present invention relates to computers and computer networks. More particularly, the present invention relates to network traffic classification method.

2. Description of Related Art

Over the past few years, the Internet infrastructure has become a critical part of the global communications fabric. Emergence of new applications and protocols, such as voice over Internet Protocol (VoIP), pear-to-pear (P2P), and video conference increase the complexity of Internet. Accompanied with this trend is the increasing demand on more reliable and secure service. As a result, quality of service (QoS) becomes a more and more important issue. For example, transmission of real-time voice and video traffic has high bandwidth, low delay, and low packet loss rate requirements. Current best-effort Internet does not provide direct QoS guarantee to these real-time applications. At the same time, enterprise network administrators may want to restrict network bandwidth used by unauthorized VoIP or P2P applications. Hence, ability to guarantee or limit the QoS of specific types of network traffic may be desired in various different scenarios. Differentiated Services (DiffServ) is a method designed to guarantee different levels of QoS for different types of network traffic. It is achieved by configuring a "type of service" (TOS) field in a network data packet. For example, the DiffServ code point (DSCP) field in the IP header may be set according to the type of the network traffic for it to receive appropriate level of priority. Unfortunately, such design depends highly on network protocols, especially proprietary protocols, for observing DiffServ regulations. For example, in the worst case, the DiffServe method may be defeated if multiple protocols all set DSCP of their corresponding data packets to the highest number. Therefore, there is a need to classify network traffic flows in real time instead of relying on any tags in packet headers.

SUMMARY OF THE INVENTION

In general, in one aspect, the present invention involves classifying a network traffic flow by providing a first subspace, corresponding to a first classification, from a first training traffic flow; representing the network traffic in a stochastic process model; extracting a first power spectral density (PSD) feature vector from the network traffic flow according to a spectral analysis of the stochastic process model; measuring a first similarity of the first PSD feature vector with the first subspace according to a first similarity metric; and identifying a first classification of the network traffic flow according to the first similarity. Preferably, the present invention also includes providing a second subspace, corresponding to a second classification, from a second training traffic flow; measuring a second similarity of the first PSD feature vector with the second subspace according to a second similarity metric; and identifying a second classification of the network traffic flow according to the second similarity. Preferably, providing the first subspace includes representing the first training traffic in another stochastic process model; extracting a plurality of PSD feature vectors from the first training traffic flow according to the spectral analysis of the other stochastic process model; composing the first subspace using the plurality of PSD feature vectors; decomposing the first subspace into one or more segments; and identifying one or more bases each representing a structure of a segment. Preferably, the first subspace is decomposed according to minimizing a coding length of the one or more segments, the first similarity is measured by a normalized distance from the first PSD feature vector to the first subspace, and the normalized distance is defined according to the one or more bases of the first subspace. Preferably, the stochastic process model comprises a plurality of parameter set each corresponding to a packet of the network traffic flow, and each parameter set comprises a packet size and a packet arrival time associated with the corresponding packet. Preferably, the stochastic process model further includes a continuous time stochastic process; extracting the first power spectral density (PSD) feature vector includes processing the continuous time stochastic process through a low pass filter; sampling the low pass filtered continuous time stochastic process at a sampling frequency to produce a discrete time sequence; and extracting the PSD feature vector from a plurality of PSDs estimated from the discrete time sequence. Preferably, the sampling frequency corresponds to a period of substantially 0.5 milliseconds. Optionally, the first or second classification is one from the list consisting of audio traffic and video traffic. Optionally, the present invention also includes extracting a first sub flow of the network traffic flow according to the packet size; comparing a variance of the packet size to a predetermined threshold; and identifying a third classification of the network traffic according to the comparison. Optionally, the third classification is file traffic. Other aspects and advantages of the invention will be apparent from the following description and the appended claims.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

FIG. 1B shows an exemplary network traffic flow in accordance with one embodiment of the present invention.

DETAILED DESCRIPTIONS OF THE INVENTION

Figure 1A:
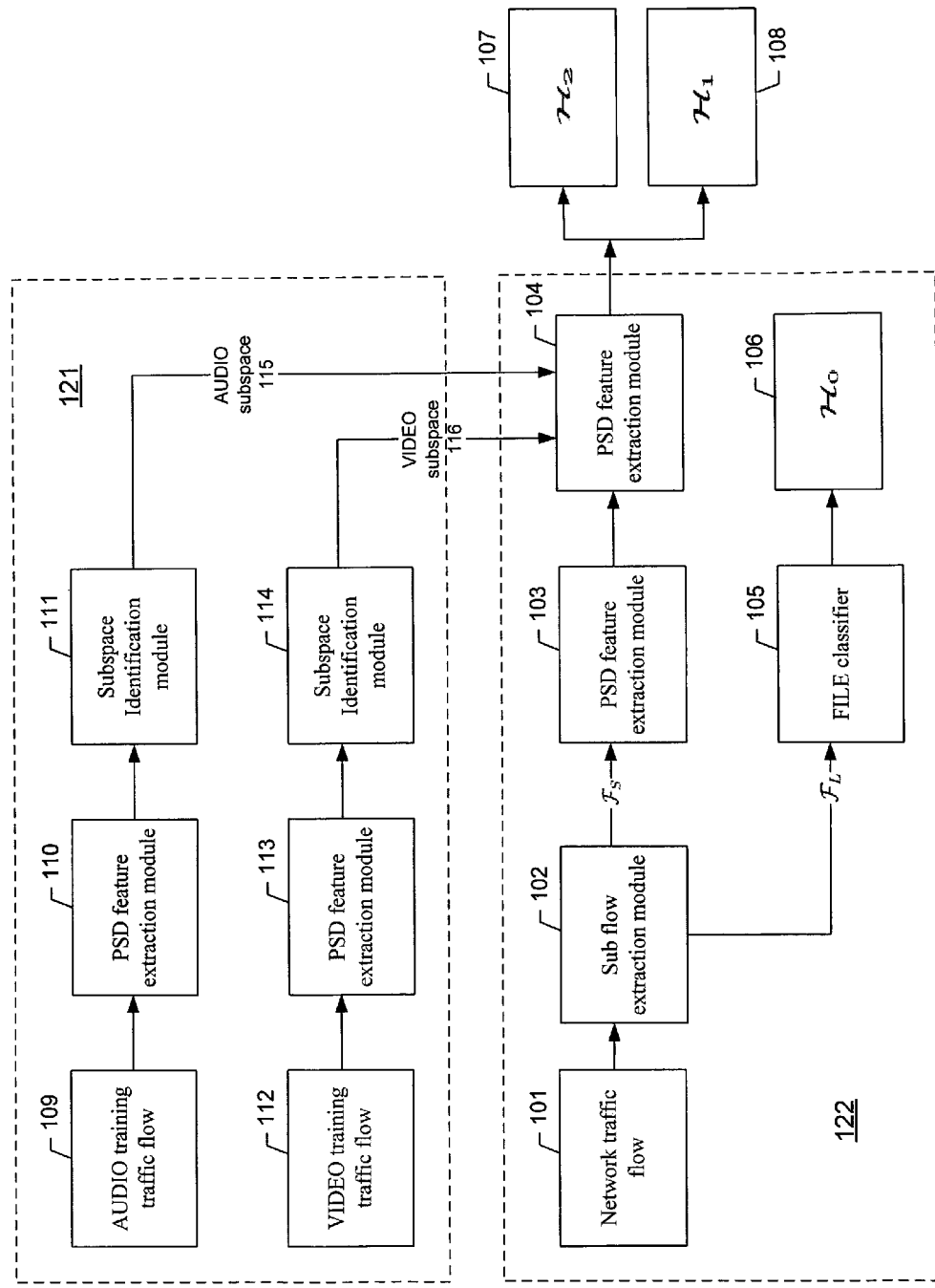
FIG. 1A shows a system architecture diagram in accordance with one embodiment of the present invention.

A network traffic flow may be classified into multiple classifications, e.g., types or categories such as AUDIO (e.g., VoIP traffic flow), VIDEO (e.g., video conference traffic flow), FILE (e.g., file transfer traffic flow), UNKNOWN (e.g., unknown traffic flow), or other categories. Here a flow may be uniquely determined by 5 tuples in Transmission Control Protocol (TCP) and User Datagram Protocol (UDP), i.e., source IP address, destination IP address, source port, destination port, and protocol number. However, this classification scheme may be inappropriate because of the trend for session layer to reuse transport layer resources. For example, Skype, a proprietary peer-to-peer VoIP network, may be used by two users to communicate with each other while they may talk, type instant messages (IM), and transfer files at the same time. Skype may transmit different types of traffic over the same transport layer connection. Other applications such as MSN messenger (MSN), Google Talk (GTalk), or other instant messaging application may also allow session layer to reuse transport layer resources. In these examples, a network traffic flow may carry multiple types of traffic and may be referred to as "hybrid flow". For example, a hybrid flow may be represented by a hypothesis vector $\mathcal{H}=\langle\mathcal{H}_0, \mathcal{H}_1, \mathcal{H}_2\rangle$, where $$\mathcal{H}_0 = \begin{cases} 0 & \text{if the flow carries no FILE traffic} \\ 1 & \text{if the flow carries FILE traffic} \end{cases} \quad (1)$$

$$\mathcal{H}_1 = \begin{cases} 0 & \text{if the flow carries no AUDIO traffic} \\ 1 & \text{if the flow carries AUDIO traffic} \end{cases} \quad (2)$$

$$\mathcal{H}_2 = \begin{cases} 0 & \text{if the flow carries no VIDEO traffic} \\ 1 & \text{if the flow carries VIDEO traffic} \end{cases} \quad (3)$$

In some examples, the hypothesis vector $\mathcal{H}=\langle\mathcal{H}_0, \mathcal{H}_1, \mathcal{H}_2\rangle$ may represent a true state of a hybrid flow and $\hat{\mathcal{H}}=\langle\hat{\mathcal{H}}_0, \hat{\mathcal{H}}_1, \hat{\mathcal{H}}_2\rangle$ may represent an estimated hypothesis vector of the hybrid flow. Although only three parameters $\mathcal{H}_0$, $\mathcal{H}_1$, and $\mathcal{H}_2$ are shown in the three dimensional hypothesis vector here, different number of parameters may be necessary and the hypothesis vector may have higher or lower dimension than three in other examples. In another example, different types of network traffic flow may be included in the hybrid flow and the hypothesis vector may represent network traffic flows different from the AUDIO, VIDIO, or FILE.

A network traffic flow may be modeled by as a stochastic process. For example, the network traffic flow may be defined as a set of data packets, each data packet being represented by data packet features, such as packet size and packet arrival time. Thus, a network traffic flow may be represented by $$\mathcal{F}=\{\langle\mathcal{P}_i, \mathcal{A}_i\rangle; i=1,\ldots,I\}, \quad (4)$$

where $\mathcal{P}_i$ and $\mathcal{A}_i$ denote the packet size and relative packet arrival time, respectively, of the ith packet in the flow with total number of I packets. In one example, only relative arrival time may be considered in which case $\mathcal{A}_1$ arrival is always 0. In other examples, there may be different number of data packet features and the data packet features may be different than described above.

FIG. 1A shows a system architecture diagram in accordance with one embodiment of the present invention. As shown in FIG. 1, the system architecture 100 includes classification module 122 and the training module 121. The classification module 122 includes network traffic flow 101, sub flow extraction module 102, PSD feature extraction modules 103, AUDIO/VIDEO classifier module 104, FILE classifier module 105, $\mathcal{H}_0$ parameter 106, $\mathcal{H}_1$ parameter 107, and $\mathcal{H}_2$ parameter 108. The training module 121 includes AUDIO training traffic flow 109, VIDEO training traffic flow 112, PSD feature extraction modules 110 and 113, subspace identification modules 111 and 114, AUDIO subspace 115, and VIDEO subspace 116. There are many ways to implement sub flow extraction, for example, in FIG. 1A the network traffic flow 101 is split into two sub-flows $\mathcal{F}_L$ and $\mathcal{F}_S$ by the sub flow extraction module 102. The sub flow $\mathcal{F}_L$ is composed of packets larger than a threshold $\theta_P$ and $\mathcal{F}_S$ is composed of smaller packets. In one example, the FILE classifier module 105 determines the $\mathcal{H}_0$ parameter 106 based on the sub flow $\mathcal{F}_S$. In another example, the sub flow $\mathcal{F}_L$ is processed by the PSD feature extraction modules 103 and AUDIO/VIDEO classifier module 104 to determine the $\mathcal{H}_1$ parameter 107 and the $\mathcal{H}_2$ parameter 108. There are many ways to implement AUDIO/VIDEO classification, for example, in FIG. 1A the AUDIO/VIDEO classifier module 104 classifies the sub flow $\mathcal{F}_L$ according to the AUDIO subspace 115 and VIDEO subspace 116. In an example shown in FIG. 1A, the AUDIO subspace 115 is generated from the PSD feature extraction module 110 and subspace identification module 111 according to the AUDIO training traffic flow 109 while the VIDIO subspace 116 is generated from the PSD feature extraction module 113 and subspace identification module 114 according to the VIDIO training traffic flow 112. Although only two sub flows $\mathcal{F}_L$ and $\mathcal{F}_S$ are shown in the example in FIG. 1A here, there may be more or less number of sub flows in other examples.

Figure 2:
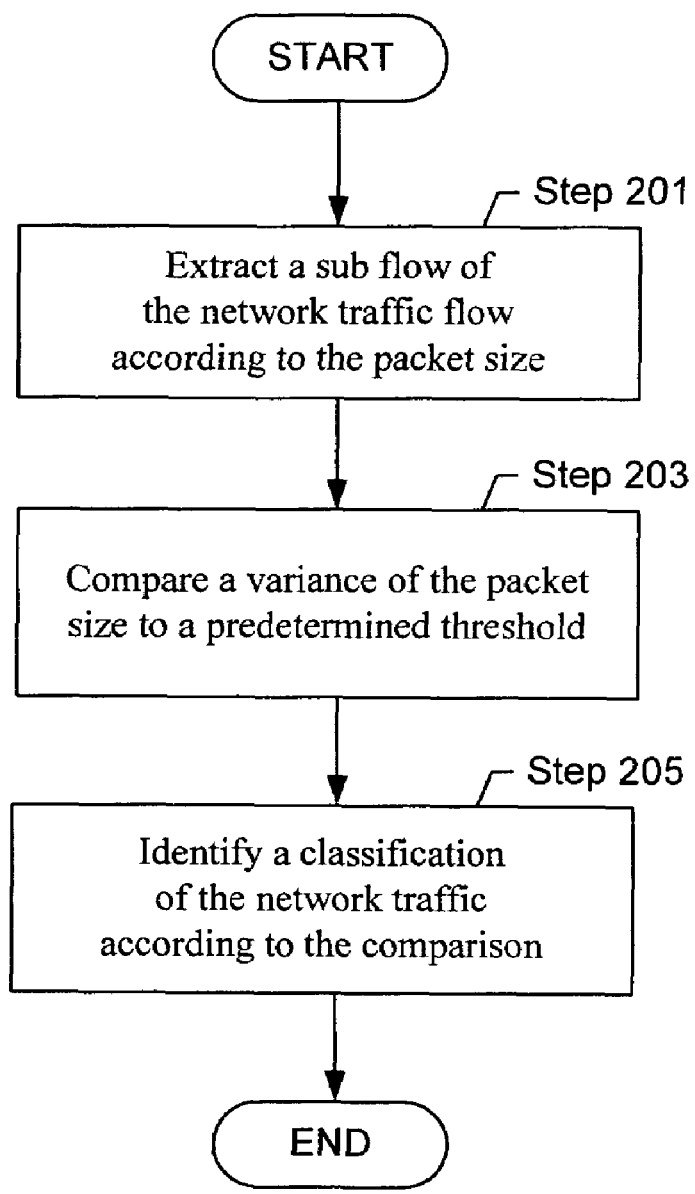
FIGS. 2-5 show flow charts of a method for real time classification of network traffic flow in accordance with one embodiment of the present invention.

FIG. 2 shows a flow chart of a method for real time classification of network traffic flow in accordance with one embodiment of the present invention. Initially, a sub flow of a network traffic flow is extracted according to packet size of data packets in the network traffic flow (step 210). For example, file transfer traffic flow has two common properties. First, although it is not specified in network protocols, almost all file transfer applications are implemented in such a way that they partition a file into equal-sized segments and transfer one segment at a time. Therefore, a FILE traffic flow may be composed of equal-sized packets, except for the last packet, whose size is usually smaller because file size may not be a multiple of segment size. Secondly, packet size of FILE traffic flow is larger than that of AUDIO or VIDEO traffic flow. The larger the file segment is, the fewer the number of packets may be required to transmit a file, which translates to less overhead contributed by packet header. To avoid fragmentation, software developers may also want to choose packet size smaller than maximum transmission unit (MTU). The most common MTU value of Ethernet, and hence the majority of the Internet, is 1500 bytes. As a result, packet size of FILE traffic flow may commonly be chosen to be close to 1500 bytes. For example, Skype uses 1397 bytes and MSN uses 1448 bytes for each packet in a FILE traffic flow. On the other hand, packet size in AUDIO or VIDEO traffic flow may be smaller. By examining Skype, MSN, and GTalk, it may be observed that VoIP packet size is nominally from 50 bytes to 200 bytes, and video conference packet size is nominally from 50 bytes to 600 bytes. Therefore, based on the description above, packet size in a network traffic flow may be used as criteria to separate FILE traffic flow from AUDIO or VIDEO traffic flow within a hybrid flow. Continue to the discussion of FIG. 2, a variance of packet size in a network traffic flow is compared to a predetermined threshold in step 203. For example, once a sub flow $\mathcal{F}_L$ is extracted in step 201, the variance of packet size in the sub flow $\mathcal{F}_L$ may be estimated, for example by the FILE classifier module 105 shown in FIG. 1A. As mentioned above, FILE traffic flow is commonly composed of equal-sized packets, except for the last packet. Thus, variance of packet size in a FILE traffic flow may be close to zero. Therefore, a network traffic flow may be classified as FILE traffic flow according to the comparison in step 203 (step 205). In one example, in step 203 a threshold may be set as $\theta_{94}$ and in step 205 the FILE classifier module 105 may set $\mathcal{H}_0$ such that $$\hat{\mathcal{H}}_0 = \begin{cases} 0 & \frac{1}{I-1}\sum_{i=1}^{I}(\mathcal{P}_i - \overline{\mathcal{P}})^2 > \theta_\sigma \\ 1 & \frac{1}{I-1}\sum_{i=1}^{I}(\mathcal{P}_i - \overline{\mathcal{P}})^2 \leq \theta_\sigma \end{cases}, \text{ where} \quad (5)$$

$$\overline{\mathcal{P}} = \frac{1}{I}\sum_{i=1}^{I}\mathcal{P}_i.$$

Figure 3:
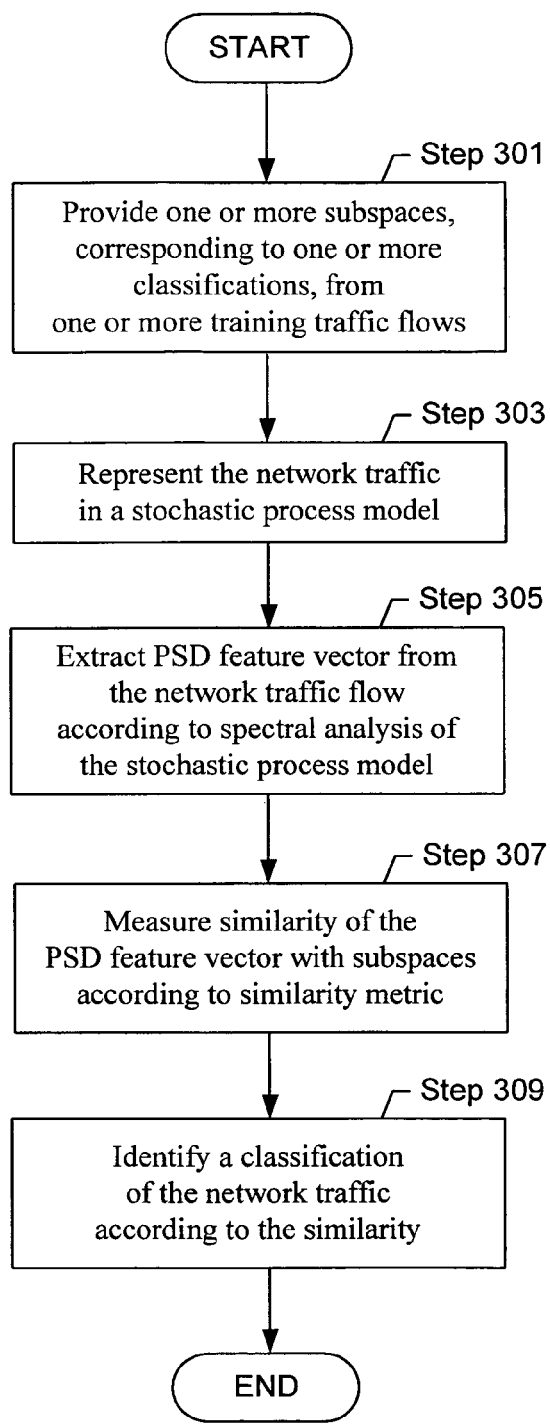

FIG. 3 shows another flow chart of a method for real time classification of network traffic flow in accordance with one embodiment of the present invention. Comparing to the example shown in reference to FIG. 2 above, classification of AUDIO or VIDEO traffic flows is more complicated. Generally speaking, to solve a pattern classification problem, one defines a feature vector, which is a summary (also known as a statistic) of raw bit stream in a network traffic flow. During a training phase, the method may extract training feature vectors from training traffic flows for each category and maintains them or their statistics, such as a subspace as described in reference to FIG. 4A below (step 301). During a classification phase, a network traffic flow, or a sub flow extracted from a network traffic flow, may be first represented as a stochastic process as described above (step 303). The method may extract PSD feature vectors using the stochastic process model (step 305). A general classifier, e.g., the AUDIO/VIDIO classifier module 104 shown in FIG. 1A, then makes decision by measuring similarity between the feature vector of the network traffic flow being classified and each of the multiple training feature vectors (step 307). The classification is then determined according to predefined criterion (step 309).

Referring to step 305, there are many ways to define the mapping from raw bit stream in a network traffic flow to feature vector. In one example, power spectral density (PSD) feature vector, which exploits regularities in AUDIO and VIDEO traffic, may be extracted by PSD feature extraction modules 110, 113, and 103 shown in FIG. 1A. More details are described in reference to FIGS. 1C and 4 below.

Referring to step 307, there are also many ways to define the similarity metric. Many similarity metrics have been used in the prior art, for example, cost function, Euclidean distance of nearest-neighbor (1-NN) or K-nearest-neighbor (K-NN), and others. Generally speaking, no similarity metric is guaranteed to be the best for all applications. For example, certain cost function is applicable only when likelihood probabilities are well estimated, which requires the number of training traffic flows to be much larger than the number of dimensions in a feature vector. Therefore, it is not suitable for classification based on high dimensional feature vector, such as the PSD feature vector as described below in reference to FIG. 1B. Euclidean distance of 1-NN and K-NN are optimal only when the assumption is true that data, i.e., sampled data corresponding to network traffic flow, of same category are clustered together. This may not always be true. In an example, by studying the data set, a set of sampled data corresponding to a set of network traffic flows, a similarity metric may be based on the normalized distance from feature vector of the network traffic flow being classified to a subspace obtained during training phase, as described in step 301 above. The idea is the following. Suppose the feature vectors belong to a space $\mathbb{R}^M$ of dimensions M. During the training phase, low (i.e., less than M) dimensional subspace structures of training data may be identified from the high dimensional space $\mathbb{R}^M$. Here, the low dimensional subspace is a portion, or subset, of the high dimensional space $\mathbb{R}^M$. This may be identified by the subspace identification modules 111 and 114 as shown in FIG. 1A. More details are described in reference to FIG. 5 below.

Referring back to step 307, during the classification phase, the normalized distances may be calculated between the feature vector of the network traffic flow being classified and the identified subspaces. In one example, in each category, such as AUDIO traffic flow and VIDEO traffic flow, the normalized distance may be defined as the minimum distance. For example, by comparing the normalized distances, to the identified subspace associated with the AUDIO traffic flow category and the VIDEO traffic flow category respectively, with their corresponding predefined thresholds, the network traffic flow may be classified as AUDIO traffic flow, VIDEO traffic flow, or UNKNOWN traffic flow. This may be performed by the AUDIO/VIDEO classifier module 104 as shown in FIG. 1A.

AUDIO and VIDEO protocols may specify a constant interval between two consecutive packets at the transmission side. This constant interval may be referred to as inter-packet delay (IPD). For example, table I lists several speech codec standards and the corresponding specified.

TABLE I

Commonly used speech codec and their specifications

| Standard | Codec Method | Inter-Packet Delay (ms) |
|---|---|---|
| G.711 [28] | PCM | .125 |
| G.726 [29] | ADPCM | .125 |
| G.728 [30] | LD-CELP | .625 |
| G.729 [31] | CS-ACELP | 10 |
| G.729A [31] | CS-ACELP | 10 |
| G.723.1 [32] | MP-MLQ | 30 |
| G.723.1 [32] | ACELP | 30 |

Due to random propagation delay of each packet, the inter-arrival time (IAT) between consecutive packets arriving at a network device, e.g., a router where network traffic features are measured, may also be random. This is known as jitter. However, the IATs may not vary too much if IPDs remains constant. This may constitute a regularity pattern residing in packet arrival time parameters of an AUDIO or VIDEO traffic flow. In addition, packet sizes of AUDIO or VIDEO traffic flows vary periodically. For example, most video coding schemes use two types of frames, i.e., intra frames (I-frame) and predicted frames (P-frame). An I-frame is a frame coded without reference to any other frame except itself. It serves as the starting point for a decoder to reconstruct the video stream. A P-frame may contain both image data and motion vector displacements and/or combinations of the two. Its decoding needs reference to previously decoded frames. Packets containing I-frames are in general larger than those containing P-frames. Usually, the number of P-frames between two consecutive I-frames is constant. Therefore, periodic variation of packet size may be observed. Voice streams may have similar phenomenon if linear prediction coding (LPC), e.g., code excited linear prediction (CELP) voice coder, is employed. Therefore, multiple regularity patterns may reside in packet size parameters of a network traffic flow. Further, such regularity pattern may remain invariable in a hybrid flow. FIG. 1B shows an exemplary network traffic flow in accordance with one embodiment of the present invention. FIG. 1B depicts a scenario when a network traffic flow carries multiple sessions, such as a VoIP session and a file transfer session. At the transmission side, AUDIO packets 131 are transmitted periodically whereas FILE packets 132 are transmitted more randomly. When the flow is captured, the high regularity of AUDIO packet arrival events still maintains, although packets of two sessions are interleaved with each other. Accordingly, by identifying regularities in network traffic flows, especially hybrid flows, AUDIO or VIDEO traffic flows may be classified. In one example, time domain regularity detection may be employed but it is not a straightforward task. In other examples, PSD features, which contain information in frequency domain may be employed.

Figure 1C:
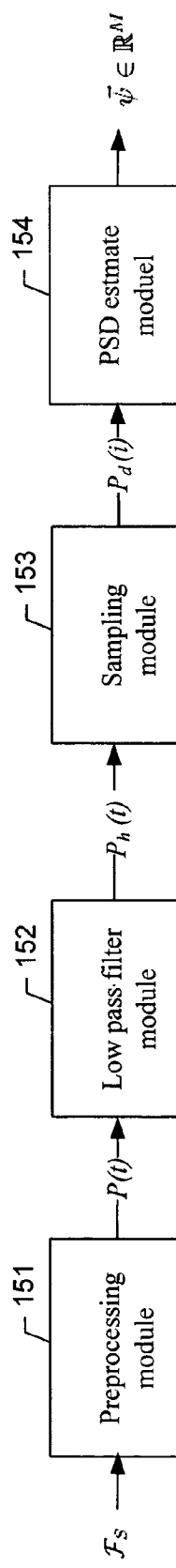
FIG. 1C shows a schematic block diagram of the PSD feature extraction module in accordance with one embodiment of the present invention.

FIG. 1C shows a schematic block diagram of the PSD feature extraction module 150 in accordance with one embodiment of the present invention. The PSD feature extraction modules 103, 110, and 113, as shown in FIG. 1A, are essentially the same as of the PSD feature extraction module 150. Here, the PSD feature extraction module 150 includes preprocessing module 151, low pass filter (LPF) 152, sampling module 153, and PSD estimate module 154. The preprocessing module 151 converts a network traffic flow $\mathcal{F}_S$ into a stochastic process model $\mathcal{P}(t)$. The low pass filter (LPF) 152 converts stochastic process model P(t) into a low pass filtered output $P_h(t)$. The sampling module 153 converts $P_h(t)$ into discrete samples $P_d(i)$. The PSD estimate module 154 converts the discrete samples $P_d(i)$ into $\vec{\psi} \in \mathbb{R}^M$.

Figure 4:
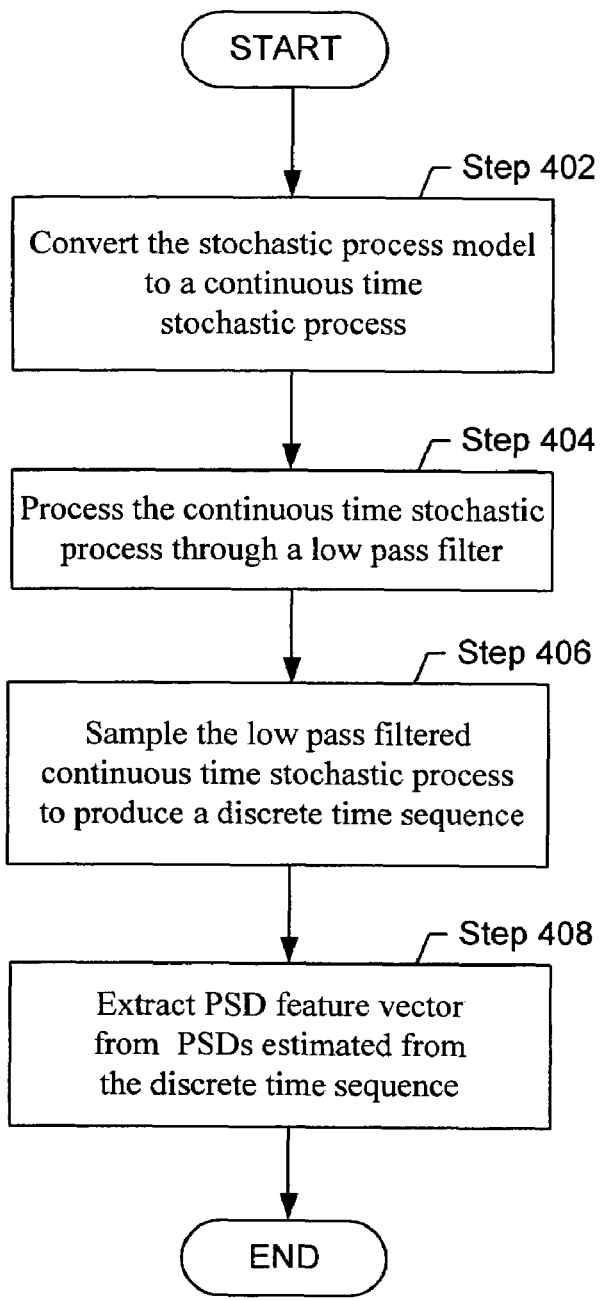

FIG. 4 shows yet another flow chart of a method for real time classification of network traffic flow in accordance with one embodiment of the present invention. Initially, a network traffic flow $\mathcal{F}_S$, which may be modeled in a stochastic process as described in equation (4) above, is converted to a continuous-time stochastic process below:

$$\mathcal{P}(t) = \sum_{<\mathcal{P}, \mathcal{A}> \in \mathcal{F}_s} \mathcal{P} \delta(t - \mathcal{A}), \qquad (6)$$

where δ(·) denotes the delta function (step 402). Because digital computers are more suitable to deal with discrete-time sequences than continuous-time processes, it is desirable to transform $\mathcal{P}(t)$ to discrete-time sequence. This may be obtained by digital sampling. One critical concern over digital sampling is the aliasing problem. Suppose the sampling interval is $T_s$, then the sampling frequency $$F_s = \frac{1}{T_s}.$$

By Nyquist-Shannon sampling theorem, the sampling frequency $F_s$ should be greater than twice the maximum frequency component in the original continuous-time signal. Otherwise, aliasing happens. That is, if the original signal has a frequency component F' such that $$F' > \frac{F_s}{2}$$

then, after sampling, this frequency component is mapped to frequency F'' in the sampled sequence such that $$F' \equiv F'' \mod F_s, \qquad (7)$$

$$|F''| < \frac{F_s}{2}. \qquad (8)$$

Once aliasing happens, information in high frequency conflicts with information in low frequency. This is not desired. The continuous-time stochastic process, shown in equation (6), is a summation of delta functions, whose spectra span the entire frequency domain. Therefore, it is necessary to reshape the spectrum of $\mathcal{P}(t)$ to avoid aliasing when it is sampled at an interval $T_s$. The step 404 may be accomplished by a LPF module 152, having a transfer function $h_{LPF}(t)$, whose output may be denoted as $\mathcal{P}_h(t)$, as shown in FIG. 1C and equation (9) below.

$$\mathcal{P}_h(t) = \mathcal{P}(t) * h_{LPF}(t) = \sum_{<\mathcal{P}, \mathcal{A}> \in \mathcal{F}_s} \mathcal{P} h(t - \mathcal{A}). \qquad (9)$$

Then $\mathcal{P}_h(t)$ may be sampled at an interval $T_s$ to produce a discrete-time sequence, as shown in equation (10) below (step 406).

$$\mathcal{P}_d(i) = \mathcal{P}_h(iT_s) = \sum_{<\mathcal{P}, \mathcal{A}> \in \mathcal{F}_s} \mathcal{P} h(iT_s - \mathcal{A}), \qquad (10)$$

where i=1, ..., $$I_d = \frac{\mathcal{A}_{max}}{T_s} + 1, \mathcal{A}_{max}$$

is the arrival time of the last data packet in the network traffic flow $\mathcal{F}_S$.

The sampling interval $T_s$ may not be arbitrarily chosen. If $T_s$ is too large, then $F_s$ is too small such that useful information in high frequency may be lost. If $T_s$ is too small, then the discrete-time sequence length, $I_d$, is too large, which translates to high complexity in PSD estimation. As described above in reference to FIG. 1B, one type of regularity pattern comes from packet arrival events in real-time network traffic flow. In one example, $$T_s < \frac{IAT_{min}}{2},$$

where $IAT_{min}$ stands for the minimum IAT in the network traffic flow, may be chosen to substantially retain all useful information. However, when multiple types of network traffic flows are interleaved in one hybrid flow, IATs are much smaller than those of a non-hybrid flow. In such case, $$\frac{IAT_{min}}{2}$$

may be smaller than necessary. In another example, by studying common software supporting VoIP and video conference, such as Skype, MSN, and GTalk, $T_s$ of 0.5 milliseconds may be chosen to substantially extract all useful information for the purpose of AUDIO and VIDEO traffic flow classification.

After sampling, the PSD feature vector may be extracted by way of estimation from the discrete-time sequence (step 408). This may be accomplished by identifying regularity patterns in $\mathcal{P}(t)$, or by identifying periodic components in the discrete-time sequence $\{\mathcal{P}_d(i)\}_{i=1}^{I_d}$. In one example, identification of regularity pattern may be performed in time domain, which may be complex. In another example, PSD feature vector of $\{\mathcal{P}_d(i)\}_{i=1}^{I_d}$ may be estimated in frequency domain. For a second-order stationary sequence $\{y_i; i \in \mathbb{Z}\}$, its PSD feature vector may be defined as $$\psi(\varpi; y) = \sum_{k=-\infty}^{\infty} r(k; y) e^{-j\varpi k}, \varpi \in [-\pi, \pi), \quad (11)$$

where $\{r(k;y); k \in \mathbb{Z}\}$ is the auto-covariance sequence (ACS) of $\{y_i; i \in \mathbb{Z}\}$, i.e., $$r(k;y) = \xi[y(i)y^*(i-k)]. \quad (12)$$

The parameter $\varpi$ in equation (11) may be restricted to be within $[-\pi, \pi)$ because $\psi(\varpi; y) = \psi(\varpi + 2\pi; y)$. PSD feature vector may represent the energy distribution of the sequence $\{y_i; i \in \mathbb{Z}\}$ in frequency domain. Regularity patterns in $\{y_i; i \in \mathbb{Z}\}$ translate to dominant periodic components in its ACS, which may further map to peaks in its PSD feature vectors. This is because PSD feature vector is simply the discrete-time Fourier transform (DTFT) of ACS. According to equations (11) and (12), obtaining true PSD feature vectors requires infinitely long time series. In some examples, PSD feature vectors may be estimated from a finite portion of the sequence. There are many PSD estimation techniques, such as nonparametric methods, e.g., Welch method and filterbank methods, and parametric methods, e.g., autoregressive (AR) model, moving average (MA) model, and autoregressive moving average (ARMA) model. In one example, AR model may be used to model signals whose PSD have sharp peaks, i.e., high regularity in time domain. In another example, Levinson-Durbin Algorithm (LDA) may be used to estimate the AR model for obtaining the PSD. For example, the discrete-time sequence $\{\mathcal{P}_d(i)\}_{i=1}^{I_d}$ may be assumed to be second-order stationary. Then its PSD may be represented as $$\psi(\varpi; \mathcal{P}_d), \varpi \in [-\pi, \pi). \quad (13)$$

Recall that $\{\mathcal{P}_d(i)\}_{i=1}^{I_d}$ are obtained by sampling a continuous-time signal $\mathcal{P}_h(t)$ at time interval $T_s$, thus, the PSD may be further represented in terms of real frequency as $$\psi_f(f; \mathcal{P}_d) = \psi\left(\frac{2\pi f}{F_s}; \mathcal{P}_d\right), \quad (14)$$

where $$F_s = \frac{1}{T_s}.$$

Equation (14) shows the relationship between periodic components in continuous-time stochastic process and shape of PSD in frequency domain.

$\psi_f(f; \mathcal{P}_d)$ is a continuous function in frequency domain. In an example, a series of frequencies may be selected:

$$0 \leq f_1 < f_2 < \ldots < f_M \leq \frac{F_s}{2}, \quad (15)$$

and the PSD feature vector may be defined as $$\vec{\psi} = [\psi_f(f_1; \mathcal{P}_d), \psi_f(f_2; \mathcal{P}_d), \psi_f(f_M; \mathcal{P}_d)]^T. \quad (16)$$

$\vec{\psi} \in \mathbb{R}^M$.

As shown in FIG. 1A, PSD feature extraction modules 103, 110, and 113 are used in both training and classification phases. The time complexity of PSD feature extraction module may be composed of two parts, i.e., time complexities of preprocessing and PSD estimation. From Equation (10), time complexity of preprocessing part is $O(|\mathcal{F}_S|)$. The time complexity of the LDA is $O(I_d \log(I_d))$. As $|\mathcal{F}_S| \ll I_d$. The total time complexity may be represented substantially as:

$$O(I_d \log(I_d)). \quad (17)$$

Figure 5:
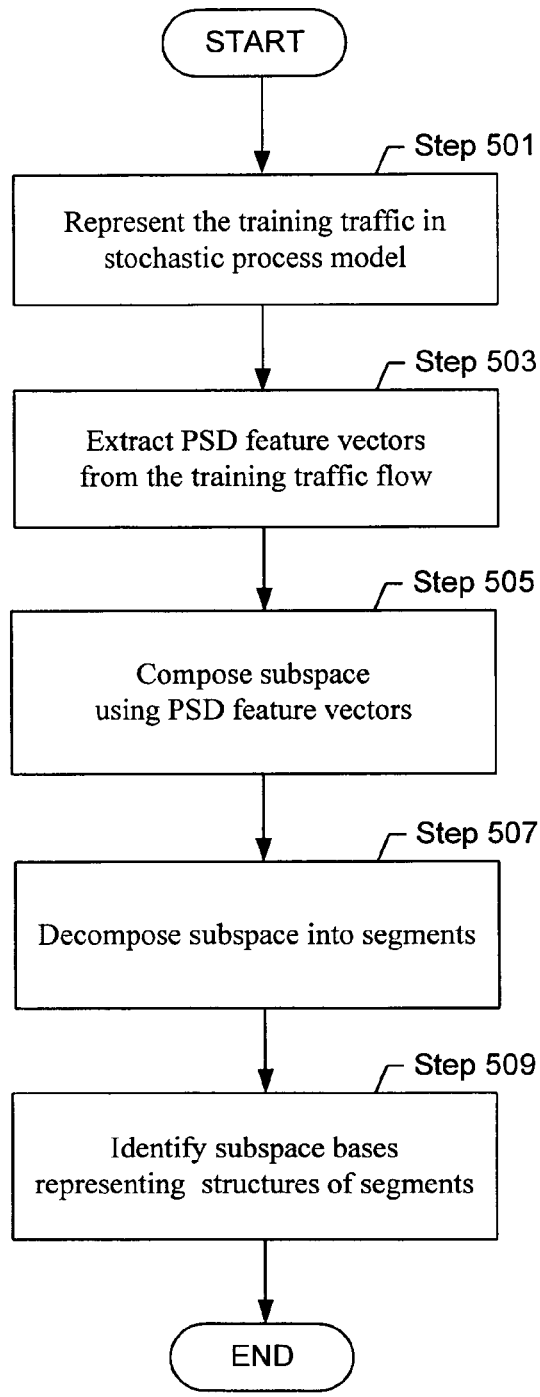

FIG. 5 shows still another flow chart of a method for real time classification of network traffic flow in accordance with one embodiment of the present invention. Initially, a training traffic flow is represented in a stochastic process model (step 501). Then PSD feature vectors are extracted from the training traffic flow according to spectral analysis of the stochastic process model (step 503). A subspace may then be composed using the PSD feature vectors (step 505). The subspace may be decomposed into segments (step 507) and then subspace bases each representing a structure of a segment may be identified (step 509).

As shown in FIG. 1A, AUDIO and VIDEO training traffic flows may be processed during the training phase. After processing these raw data through PSD feature extraction modules 110 and 113, two sets of feature vectors may be obtained as:

1) $\Psi^{(1)} \triangleq \{\vec{\psi}_1(1), \vec{\psi}_1(2), \ldots, \vec{\psi}_1(N_1)\}$, \quad (18)

which is obtained through processing AUDIO training traffic flows, where $N_1$ is the number of AUDIO training traffic flows; and 2) $\Psi^{(2)} \triangleq \{\vec{\psi}_2(1), \vec{\psi}_2(2), \ldots, \vec{\psi}_2(N_2)\}$, \quad (19)

which is obtained through VIDEO training traffic flows, where $N_2$ is the number of VIDEO training traffic flows. To facilitate further discussion, let us also regard $\Psi^{(i)}$ as a $M \times N_i$ matrix, for i=1, 2, where each column is a feature vector. In other word, $\Psi^{(i)} \in \mathbb{R}^{M \times N_i}$.

Referring to step 505, there are many techniques to identify the low dimensional subspaces embedded in $\mathbb{R}^M$ for both $\Psi_1$ and $\Psi_2$, such as principal components analysis (PCA) and Metric Multidimensional Scaling (MDS), which identify linear structure, and ISOMAP and locally linear embedding (LLE), which identify non-linear structure. All these methods assume that data are embedded in one single low-dimensional subspace. This assumption may not always be true. For example, as different software uses different voice coding, the PSD feature vector of AUDIO traffic flow may be a random vector generated from a combination of models than a single model. In such case, it is more likely that there may be multiple subspaces in which the feature vectors are embedded. Same may hold true for feature vectors of VIDEO traffic flows. In some examples, the method may include 1) clustering training feature vectors into multiple groups, which may be referred to as subspace decomposition; and 2) identifying subspace structure in each group, which may be referred to as subspace bases identification.

Referring to step 507, the purpose of subspace decomposition is to partition the data set $\Psi$, which includes N vectors each known as a base:

$$\Psi = \{\vec{\psi}(1), \vec{\psi}(2), \ldots, \vec{\psi}(N)\} \quad (20)$$

into non-overlapping K subsets such that $$\Psi = \Psi_1 \cup \Psi_2 \cup \ldots \cup \Psi_K. \quad (21)$$

For example, subspaces may be decomposed according to a minimum coding length criteria. The idea is to view data segmentation problem from the perspective of data coding/compression. Suppose one wants to find a coding scheme $C$, which maps data in $\Psi \in \mathbb{R}^{M \times N}$ to a bit sequence. As all elements are real numbers, infinite long bit sequence is needed to decode without error. Hence, one has to specify the tolerable decoding error, $\epsilon$ to obtain a mapping with finite coding length, i.e., $$\|\vec{\psi}_n - C^{-1}(C(\vec{\psi}_n))\|^2 \leq \epsilon^2, \text{ for } \forall n=1, \ldots, N. \quad (22)$$

Then the coding length of the coding scheme $C$ is a function $$\mathcal{L}_c : \mathbb{R}^{M \times N} \to \mathbb{Z}_+. \quad (23)$$

The optimal partition should minimize coding length of the segmented data, i.e., $$\min_{\Pi} \hat{\mathcal{L}}_c(\Psi; \Pi) = \min_{\Pi} \left\{ \sum_{k=1}^{K} \mathcal{L}_c(\Psi_k) + \sum_{k=1}^{K} |\Psi_k| \left[ -\log_2\left(\frac{\Psi_k}{K}\right) \right] \right\}, \quad (24)$$

where $\Pi$ is the partition scheme. The first term in equation (24) is the summation of coding length of each group, and the second one is the number of bits needed to encoding membership of each item of $\Psi$ in the K groups. The optimal partition may be achieved in the following way. Let the segmentation scheme be represented by the membership matrix, $$\pi_k \triangleq \text{diag}([\pi_{1k}, \pi_{2k}, \ldots, \pi_{Nk}]) \in \mathbb{R}^{N \times N}, \quad (25)$$

where $\pi_{nk}$ denotes the probability that vector $\vec{\psi}(n)$ belongs to subset k such that $$\sum_{k=1}^{K} \pi_{nk} = 1, \text{ for } \forall n = 1, \ldots, N \quad (26)$$

and diag(.) denotes converting a vector to a diagonal matrix. It is known in the art that the coding length may be upper bounded that $$\hat{\mathcal{L}}_c(\Psi; \Pi) \leq \sum_{k=1}^{K} \left[ \frac{tr(\Pi_k) + M}{2} \log_2 det\left(I + \frac{M}{tr(\Pi_k)\epsilon^2} \Psi \Pi_k \Psi^T\right) \right] + \sum_{k=1}^{K} \left[ tr(\Pi_k) \left(-\log_2 \frac{tr(\Pi_k)}{N}\right) \right] \triangleq \hat{\mathcal{L}}(\Psi; \Pi), \quad (27)$$

where tr (.) denotes the trace of a matrix, and det (.) denotes matrix determinant. Combining equations (24) and (27), a minimax criterion may be obtained as:

$$\hat{\Pi} = \arg\min_{\Pi} \left[ \max_{C} \hat{\mathcal{L}}_c(\Psi; \Pi) \right] = \arg\min_{\Pi} \hat{\mathcal{L}}(\Psi; \Pi). \quad (28)$$

Then for $\forall \psi_n \in \Psi$, $\psi_n \in \Psi_k$ after segmentation if and only if $$\hat{k} = \arg\min_{k} \hat{\pi}_{nk}. \quad (29)$$

There is no closed form solution for equation (28). It is known in the art that a pair-wise steepest descent method may be used to solve it. Using the above method, a partition of AUDIO feature vector set $\Psi^{(1)}$ $$\Psi^{(1)} = \Psi_1^{(1)} \cup \ldots \cup \Psi_{K_1}^{(1)}, \quad (30)$$

and a partition of VIDEO feature vector set $\Psi^{(2)}$ $$\Psi^{(2)} = \Psi_1^{(2)} \cup \ldots \cup \Psi_{K_2}^{(2)}. \quad (31)$$

may be obtained.

Referring to step 509, an exemplary algorithm to identify subspace bases for each segmentation, $$\{\Psi_k^{(i)}; k=1, \ldots, K_i, i=1,2\}, \quad (32)$$

may be shown as the function IdentifyBases below:

---

1) function $[\vec{\mu}, \hat{U}, \hat{\Sigma}, \overline{U}, \overline{\Sigma}]$ = IdentifyBases($\Psi \in \mathbb{R}^{M \times N}$, $\delta$)

2) $\vec{\mu} = \frac{1}{|\Psi|} \sum_{\vec{\psi} \in \Psi} \vec{\psi}$

3) $\Psi = [\vec{\psi}_1 - \vec{\mu}, \vec{\psi}_2 - \vec{\mu}, \ldots, \vec{\psi}_{|\Psi|} - \vec{\mu}]$ 4) Do eigenvalue decomposition on $\overline{\Psi}\overline{\Psi}^T$ such that $$\overline{\Psi}\overline{\Psi}^T = U \Sigma U^T, \quad (33)$$

where $U \triangleq [\vec{\mu}_1, \ldots, \vec{\mu}_M]$, $\Sigma \triangleq \text{diag}([\sigma_1^2, \ldots, \sigma_M^2])$, and $\sigma_1^2 \geq \sigma_2^2 \geq \ldots \geq \sigma_M^2$.

5) $\mathcal{J} = \arg\min_{\mathcal{J}} \sum_{m=1}^{\mathcal{J}} \sigma^2(m) \geq \delta \sum_{m=1}^{M} \sigma^2(m)$ 6) $\hat{U} = [\vec{u}_1, \vec{u}_2, \ldots, \vec{u}_{\mathcal{J}-1}]$ 7) $\overline{U} = [\vec{u}_{\mathcal{J}}, \vec{u}_{\mathcal{J}+1}, \ldots, \vec{u}_M]$ -continued 8)   $\hat{\Sigma} = \text{diag}([\sigma_1^2, \ldots, \sigma_{\mathcal{J}_{-1}}^2])$ 9)   $\overline{\Sigma} = \text{diag}([\sigma_{\mathcal{J}}^2, \ldots, \sigma_M^2])$ 10) end function The basic idea is to identify uncorrelated bases and choose those bases with dominant energy. As shown in equation (33), argument $\Psi$ is the feature vector set of one segmentation and $\delta$ is a user defined parameter which specifies the percentage of energy retained, e.g., 90% or 95%. It returns 5 variables. $\vec{\mu}$ is the sample mean of all feature vectors. It is the origin of the identified subspace. Columns of $u$ are the bases with dominant energy (i.e., high concentration of occurrence in the frequency domain distribution), whose corresponding variances are $\hat{\Sigma}$. These bases determine the identified low dimensional subspace spanned by $\Psi$. Columns of $u$ compose the null space of the previous subspace, whose corresponding variances are $\overline{\Sigma}$. The last two outputs are required to calculate distance of a test feature vector to the subspace, which will be described in more details below. Applying the function IdentifyBases on all segmentation $$[\vec{\mu}_k^{(i)}, u_k^{(i)}, \hat{\Sigma}_k^{(i)}, u_k^{(i)}, \overline{\Sigma}_k^{(i)}] = \text{IdentifyBases}(\Psi_k^{(i)}) \quad (34)$$

for $\forall k=1, \ldots, K_i$, $\forall i=1, 2$, may be obtained. These are the exemplary outputs of subspace identification modules 111 and 114, or the results of training phase AUDIO subspace 115 or VIDEO subspace 116 as shown in FIG. 1A.

As described above, an exemplary approach to identify subspaces spanned by PSD feature vectors of AUDIO or VIDEO training traffic flows. Specifically, parameters $$[\vec{\mu}_k^{(i)}, u_k^{(i)}, \hat{\Sigma}_k^{(i)}, u_k^{(i)}, \overline{\Sigma}_k^{(i)}] \quad (35)$$

for $\forall k=1, \ldots, K_i$, $\forall i=1, 2$, may be obtained for real time classification. Referring back to the classification phase 122 in FIG. 1A, given a network traffic flow $\mathcal{F}$, a sub flow $\mathcal{F}_S$ may be extracted, by extracting small packets in the sub flow extraction module 102, i.e., packets smaller than $\theta_P$, and passes it through the PSD feature extraction module 103 to generate PSD feature vector $\vec{\psi}$. This is the input to the AUDIO/VIDEO classifier module 104. For example, the AUDIO/VIDEO classifier module 104 works in the following way in step 307 as described in reference to FIG. 3. It first calculates normalized distances between $\vec{\psi}$ and all subspaces of both categories. Then it chooses minimum distance to each category. By comparing the two distance values to two thresholds, $\theta_A$ and $\theta_V$, respectively, decision is made. An exemplary procedure of the AUDIO/VIDEO classifier may be shown below:

1) function $[\mathcal{H}_1, \mathcal{H}_2]$ = AUDIOVIDEOClassify ($\vec{\psi}, \theta_A, \theta_V$)

2)   For $\forall i = 1, 2, \forall k = 1, \ldots, K_i$ $d_k^{(i)}$ = NormalizedDistance ($\vec{\psi}, \vec{\mu}_k^{(i)}, \overline{U}_k^{(i)}, \overline{\Sigma}_k^{(i)}$)

3)   For $\forall i = 1, 2,\ d_i = \min_k d_k^{(i)}$ 4)   if $d_1 < \theta_A$ and $d_2 > \theta_V$ 5)     $\mathcal{H}_1 = 1, \mathcal{H}_2 = 0$, i.e., AUDIO flow.

-continued 6)   else if $d_1 > \theta_A$ and $d_2 < \theta_V$

7)     $\mathcal{H}_1 = \mathcal{H}_2 = 1$, i.e., VIDEO flow.

8)   else

9)     $\mathcal{H}_1 = \mathcal{H}_2 = 0$, i.e., neither AUDIO nor VIDEO.

10)  end if 11) end function 12) function d = NormalizedDistance($\vec{\psi}, \vec{\mu}, \overline{U}, \overline{\Sigma}$)

13)  $d = (\vec{\psi} - \vec{\mu})^T \overline{U} \overline{\Sigma}^{-1} \overline{U}^T (\vec{\psi} - \vec{\mu})$ 14) end function In some examples, it may not able to distinguish a pure VIDEO traffic flow from a VIDEO+AUDIO hybrid flow. First, the difference of a VIDEO traffic flow and a VIDEO+AUDIO hybrid flow may be very small, because the piggyback technique is widely used such that AUDIO and VIDEO data may be encapsulated in the same packet. Secondly, it may be of little practical value to do that as it is very rare for two users watching each other without talking. Accordingly, in the function AUDIOVIDEOClassify, line 7, when $\mathcal{H}_2=1$, the algorithm always sets $\mathcal{H}_1=1$. In other examples, the function AUDIOVIDEOClassify may be implemented with a functionality to distinguish a pure VIDEO traffic flow from a VIDEO+AUDIO hybrid flow. The parameters $\mathcal{H}_1$ and $\mathcal{H}_2$ may be determined independently.

From lines 2 and 13 above, the time complexity of AUDIO and VIDEO classifier is $$O((K_1+K_2)M^2). \quad (36)$$

Combining equations (17) and (36), the overall complexity of the real time classification scheme may be represented as $$O(I_d \log(I_d)) + O((K_1+K_2)M^2). \quad (37)$$

Experiment results of applying the exemplary system architecture of FIG. 1A to real time network traffic classification may be summarized here. For example, two sets of experiments are conducted on network traffic flows generated by Skype with the results shown in FIGS. 6 and 7. In the other example, two sets of experiments are conducted on hybrid flow traffics generated by Skype, MSN, and GTalk with results shown in FIGS. 8 and 9. For each set of the experiments, Receiver Operating Characteristics (ROC) curves are used as the performance metric. ROC curve is a curve of detection probability, $P_D$, vs. false probability, $P_{FA}$, where, $$P_D \mathcal{H}_i \triangleq P(\mathcal{H}_i=1 | \mathcal{H}_i=1), \quad (38)$$

$$P_{FA} \mathcal{H}_i \triangleq P(\mathcal{H}_i=1 | \mathcal{H}_i=0), \quad (39)$$

for $\forall i=0, 1, 2$. By tuning the parameters $\theta_\sigma$, $\theta_A$, and $\theta_V$ according to equation (5) and the function AUDIOVIDEOClassify described above ROC curves may be generated as shown in FIGS. 6-9.

During the experiments, network traffic flows are collected from three applications, i.e., Skype, MSN, and GTalk. For each application, network traffic flows are collected in two scenarios. For the first scenario, two laboratory computers acting as peers were communicating with each other. There was direct connection between the two peers. For the second one, a firewall was used to block direct connection between the two peers so that the application was forced to use relay nodes. For example, real time classification method is performed on first 10 seconds of each collected net work flow, i.e., $A_{max} \leq 10$ seconds. As an example the sampling interval is set as $T_s$=0.5 milliseconds.

Figure 6A:
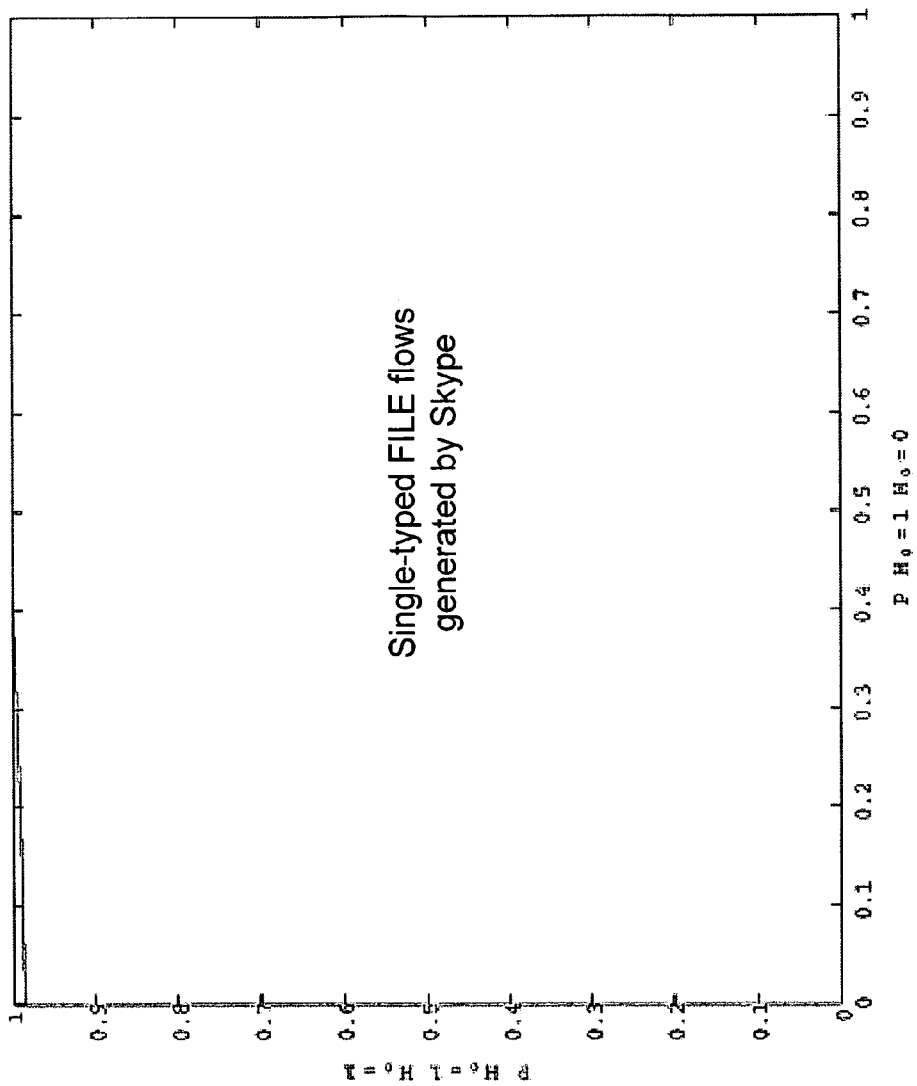
FIG. 6 shows exemplary ROC curve of single type flow from one network operator in accordance with one embodiment of the present invention.
Figure 6B:
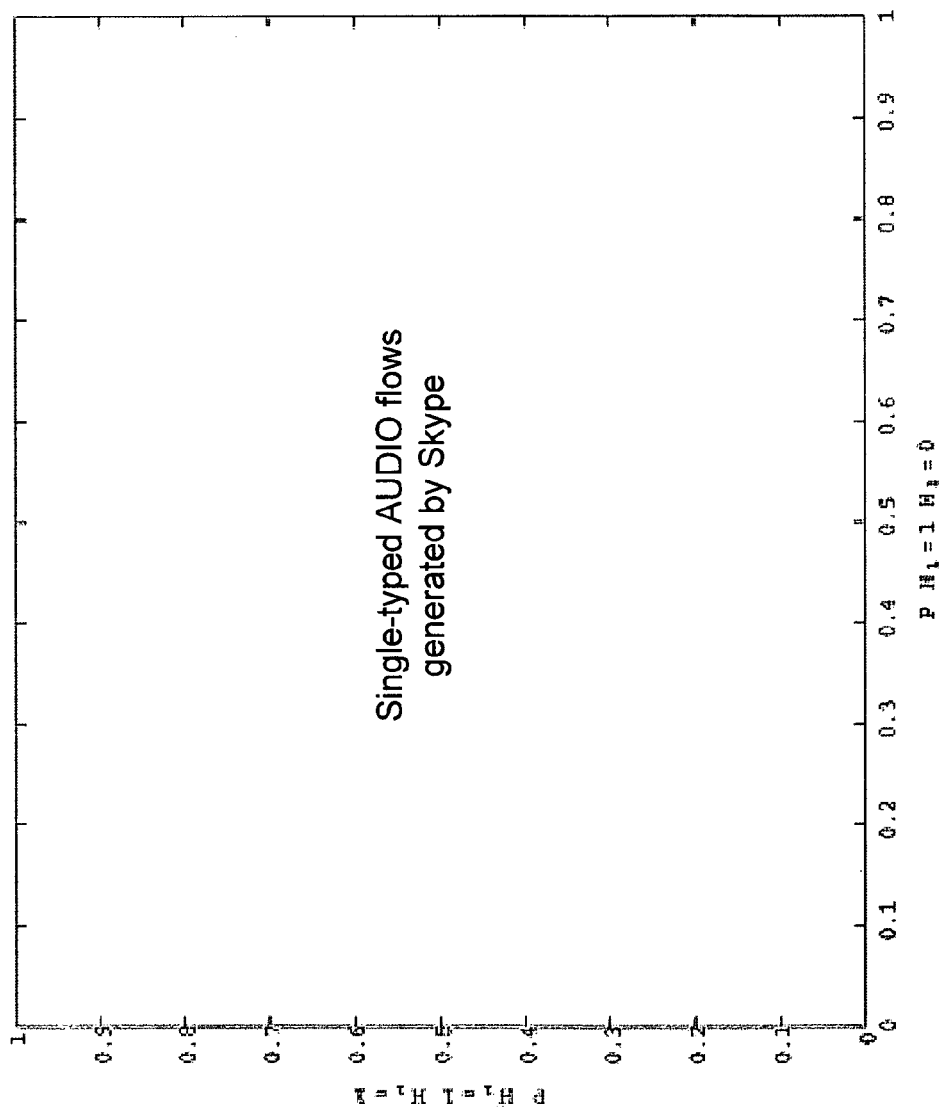
Figure 6C:
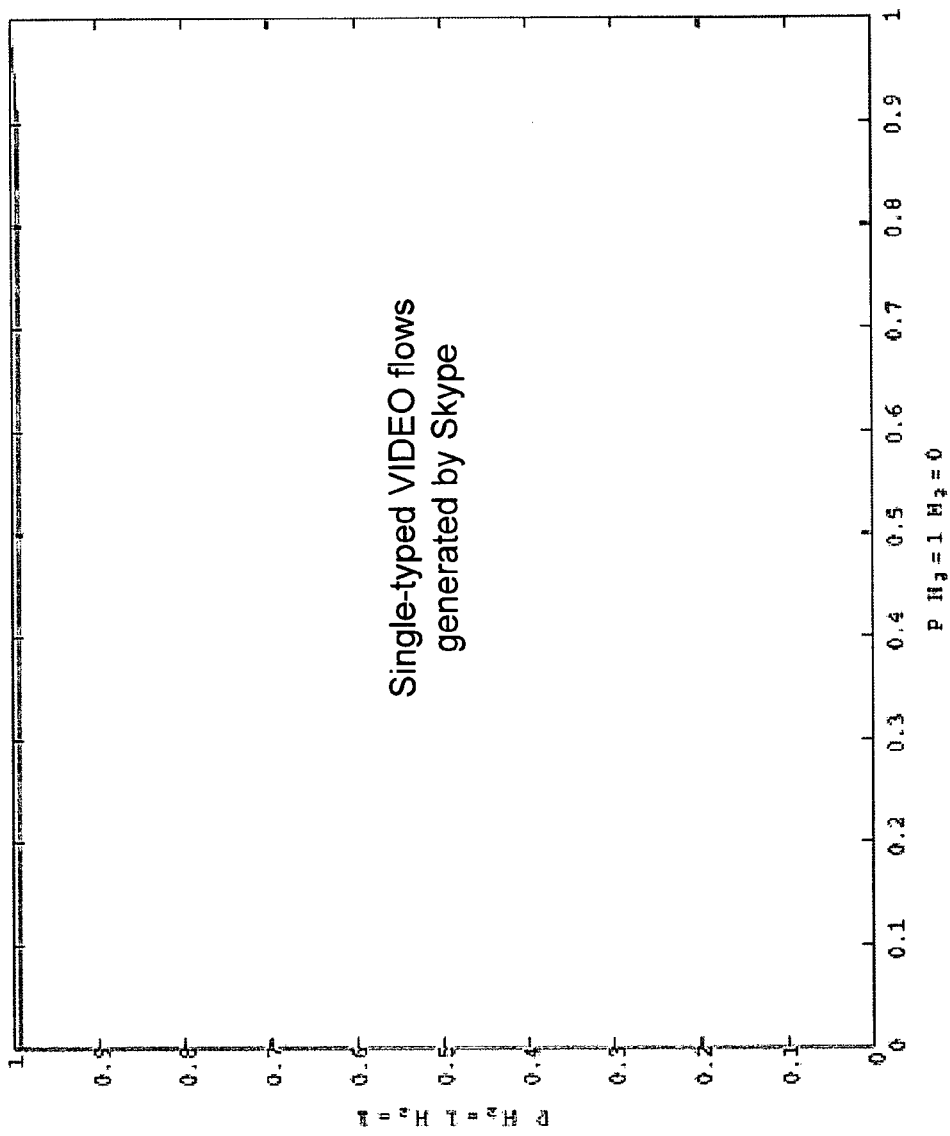

In one example, the scenario where each Skype flow carries one type of traffic is considered. In other words, for each network traffic flow, none or one of $\mathcal{H}_0$, $\mathcal{H}_1$, and $\mathcal{H}_2$ is 1. FIG. 6A-6C show the ROC curve of classifying FILE, AUDIO, and VIDEO traffic flows.

Figure 7A:
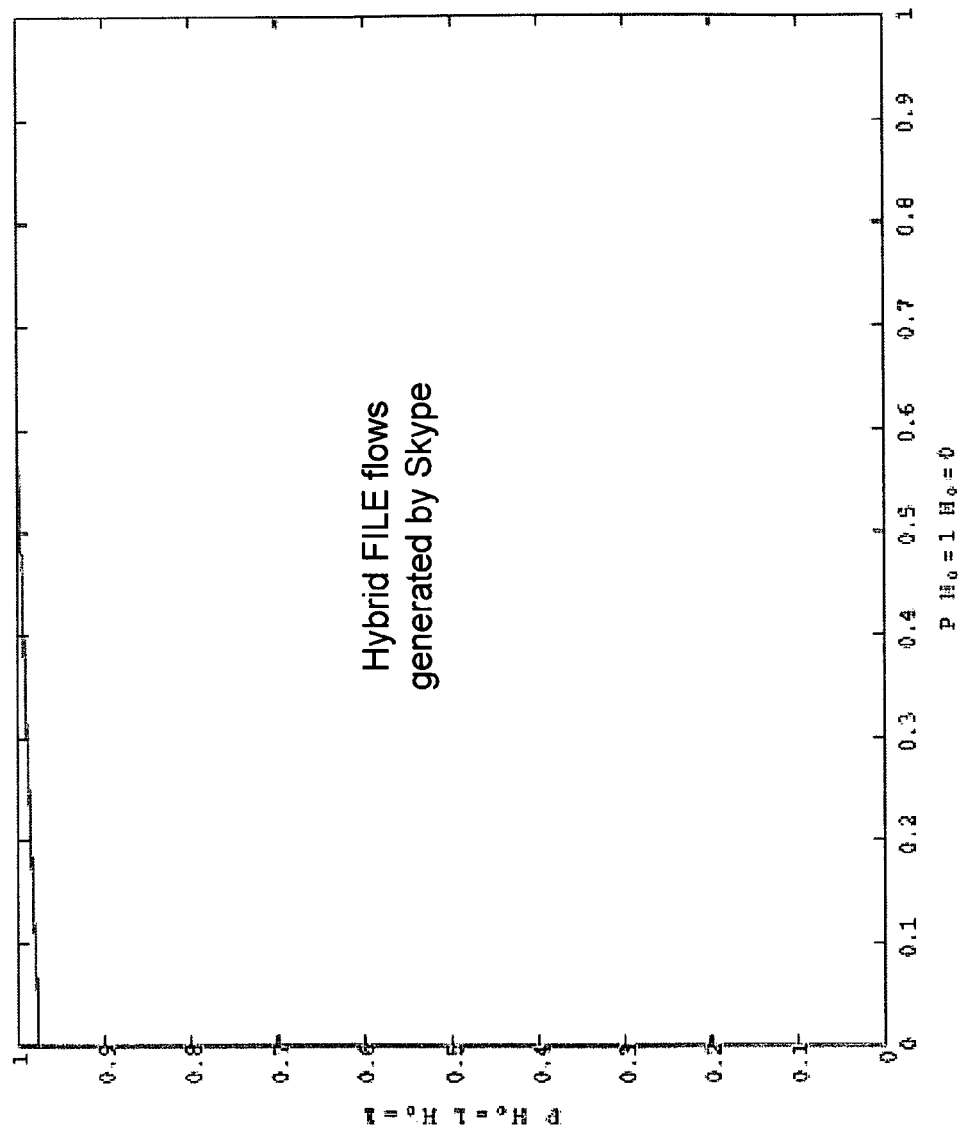
FIG. 7 shows exemplary ROC curve of hybrid flow from one network operator in accordance with one embodiment of the present invention.
Figure 7B:
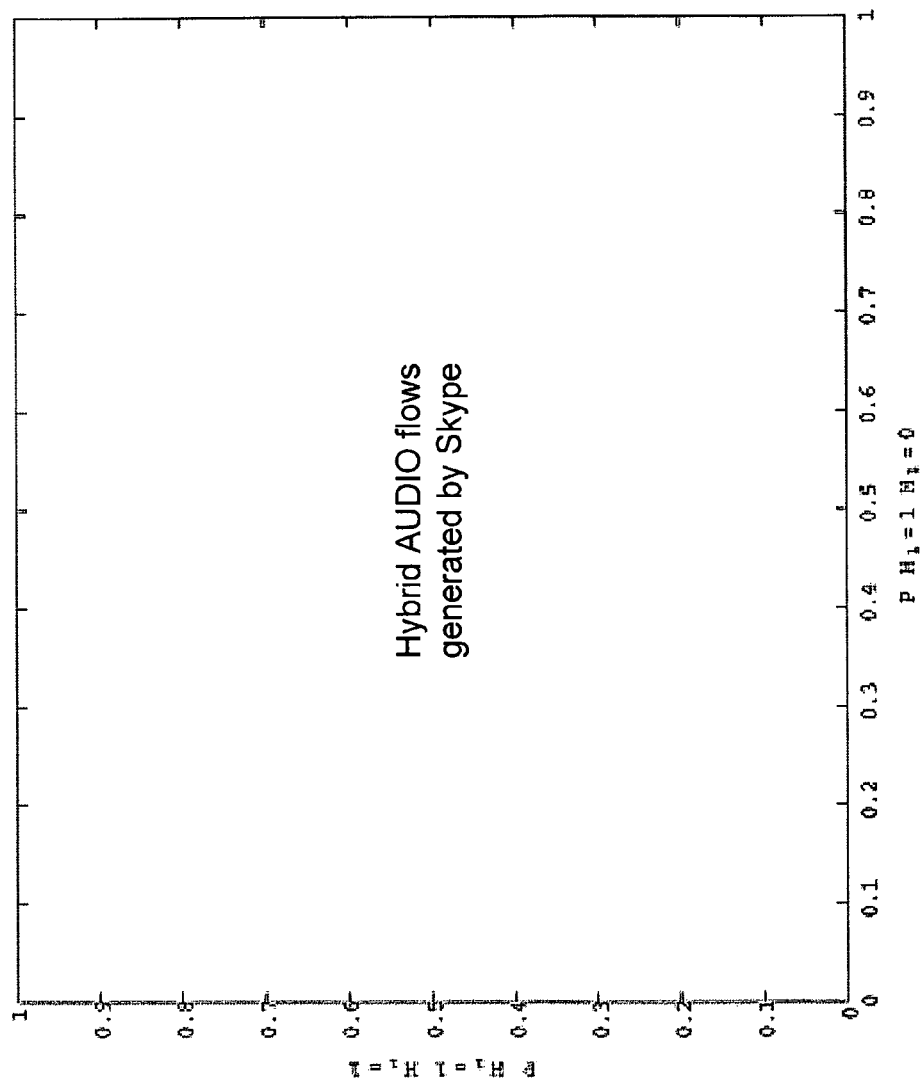
Figure 7C:
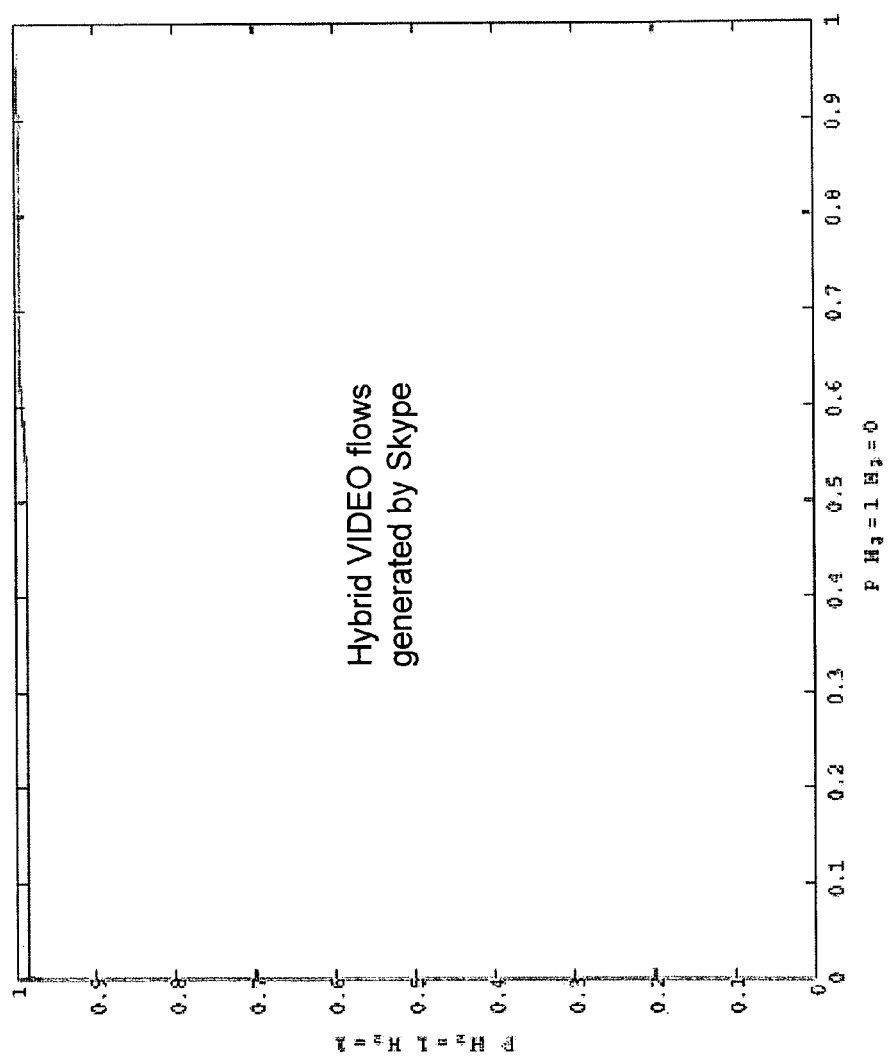

In another example, hybrid Skype traffic flows is considered. In other words, for each network traffic flow flow, none or one or several of $\mathcal{H}_0$, $\mathcal{H}_1$, and $\mathcal{H}_2$ may be 1. FIG. 7A-7C show the ROC curves of classifying FILE, AUDIO, and VIDEO flows, respectively.

In yet another example, experiments are performed on network traffic generated by Skype, MSN, and GTalk, as these are very common applications at the current time. In other words, an AUDIO traffic flow may be a VoIP flow generated by Skype, MSN, or GTalk. So are VIDEO or FILE traffic flows. Note that, GTalk does not support video conference. Similarly, two sets of experiments are conducted, one on single-typed network traffic flows and the other on hybrid flows.

Figure 8A:
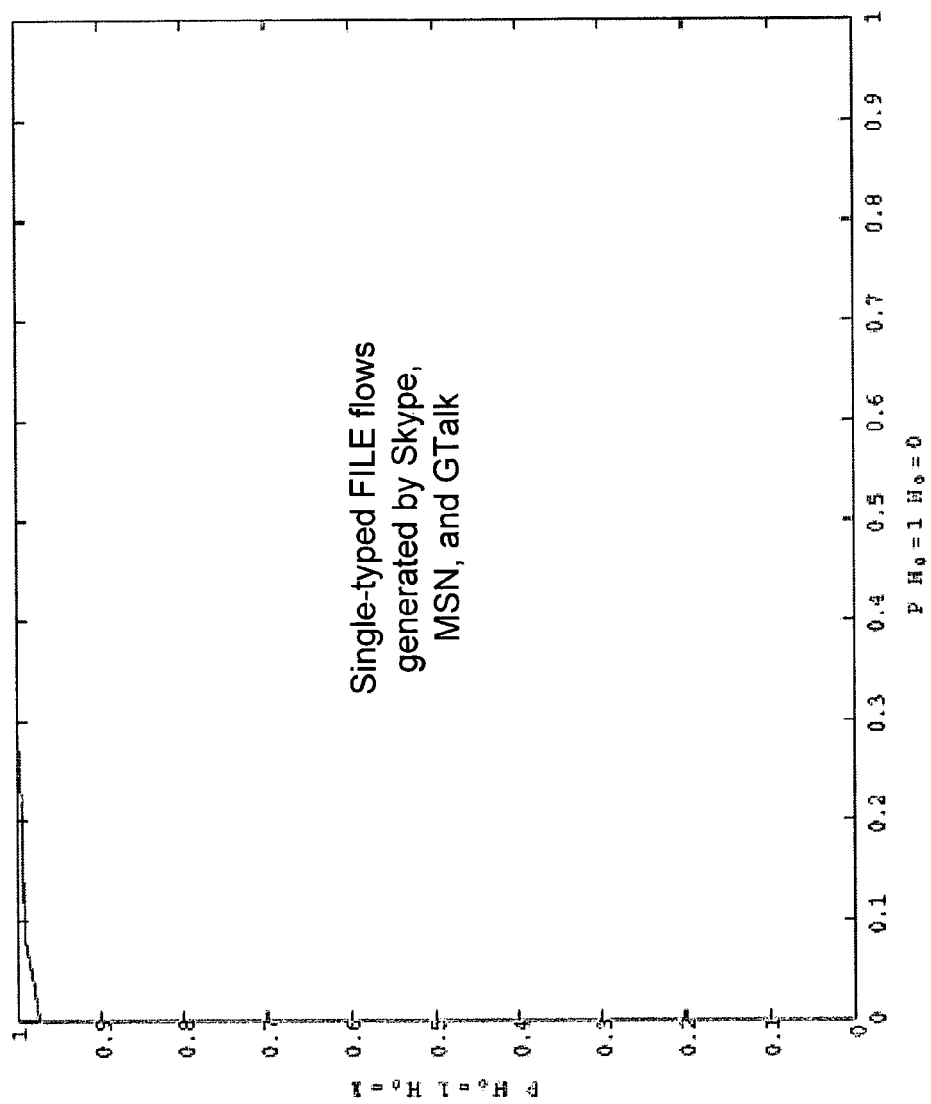
FIG. 8 shows exemplary ROC curve of single type flow from multiple network operators in accordance with one embodiment of the present invention.
Figure 8B:
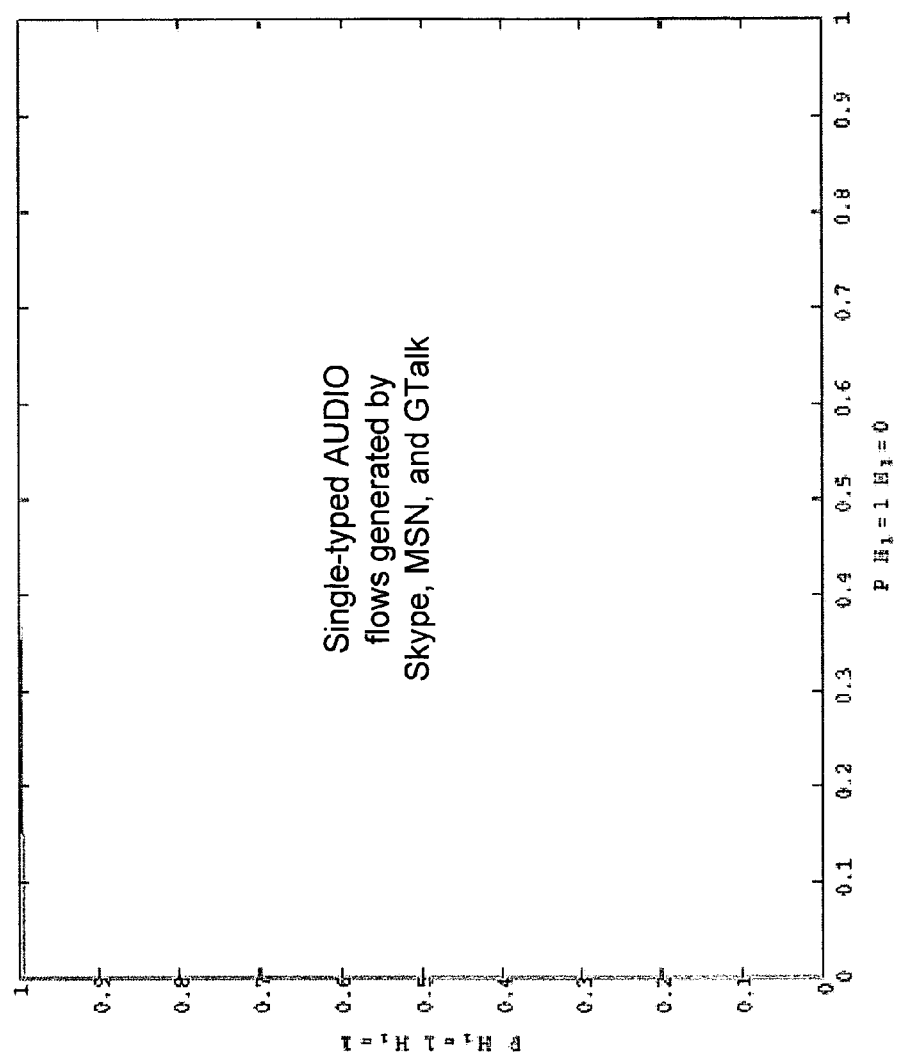
Figure 8C:
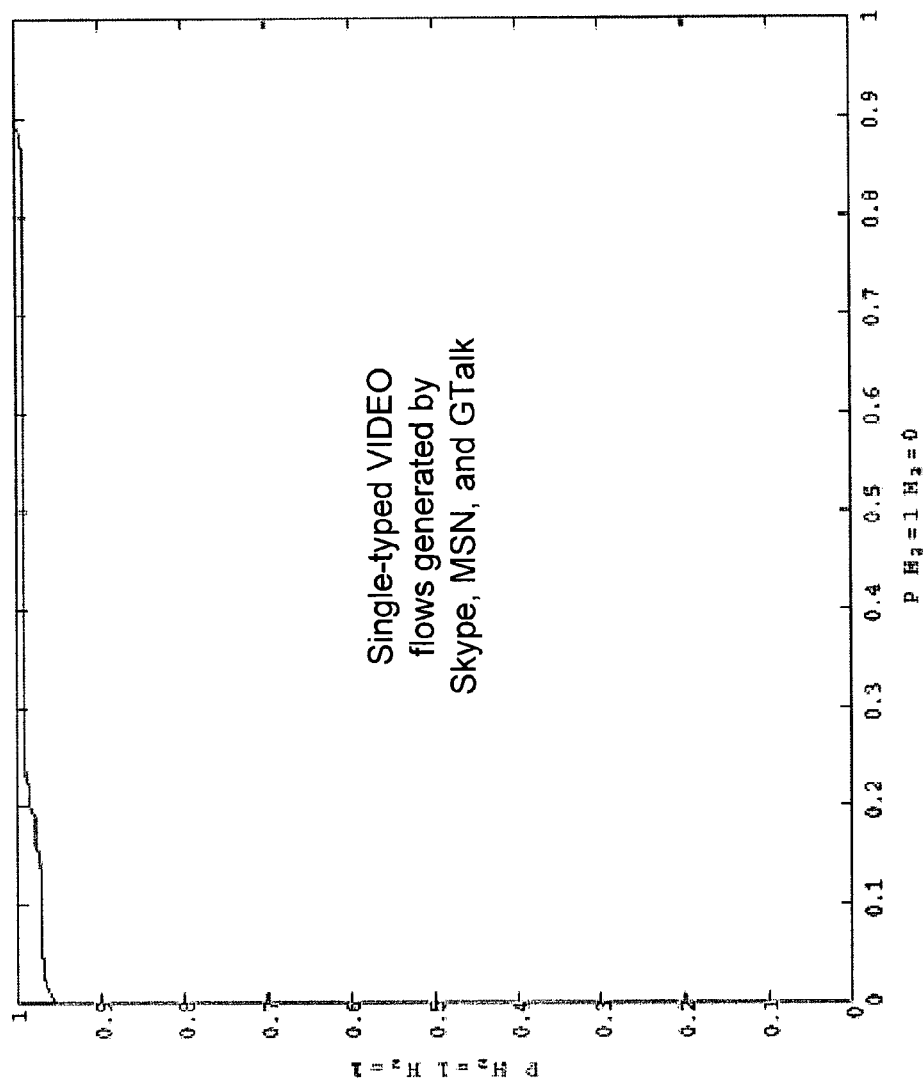

In one example, the scenario where each flow carries one type of traffic is considered. By tuning the thresholds, $\theta_O$, $\theta_A$, and $\theta_V$, ROC curves of classifying FILE, AUDIO, and VIDEO traffic flows may be generated. FIG. 8A-8C show the ROC curves of classifying FILE, AUDIO, and VIDEO flows in single typed traffic flows from multiple network operators in accordance with one embodiment of the present invention.

Figure 9A:
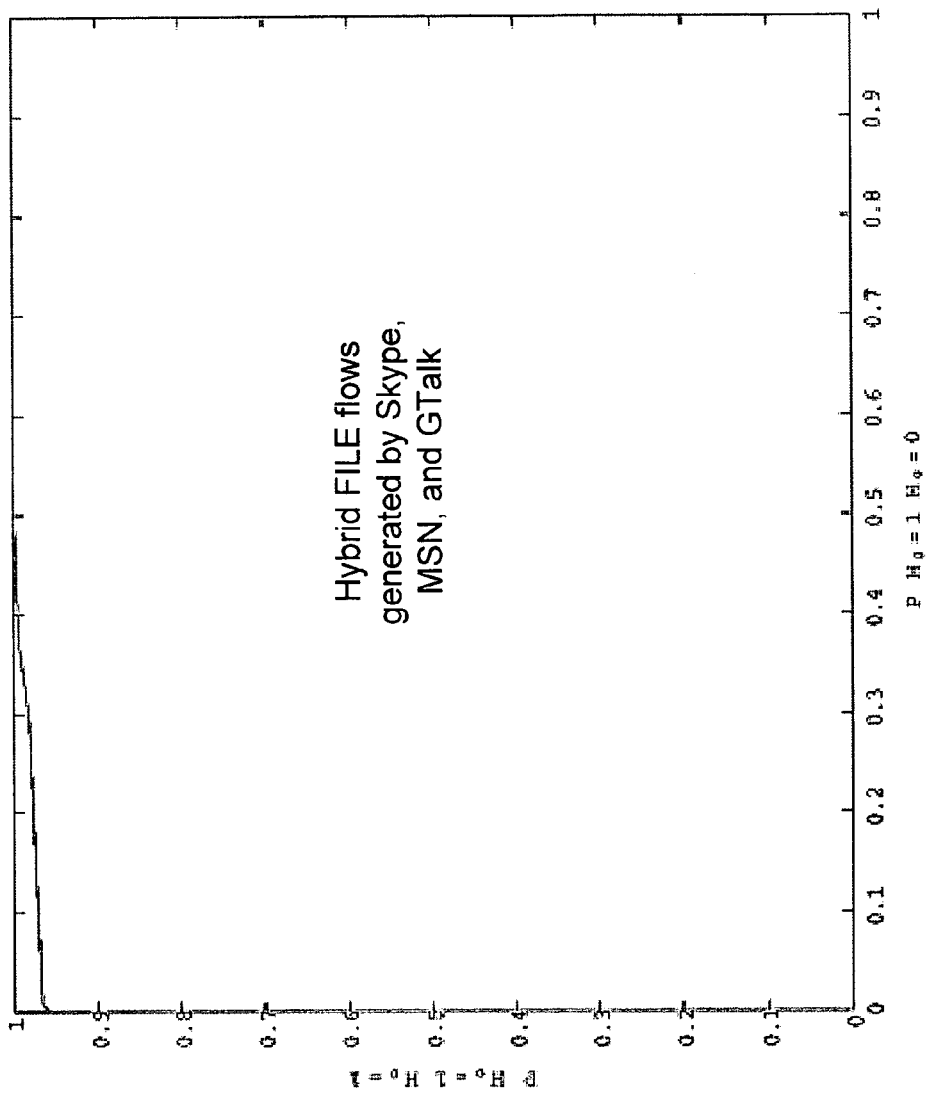
FIG. 9 shows exemplary ROC curve of hybrid flow from multiple network operators in accordance with one embodiment of the present invention.
Figure 9B:
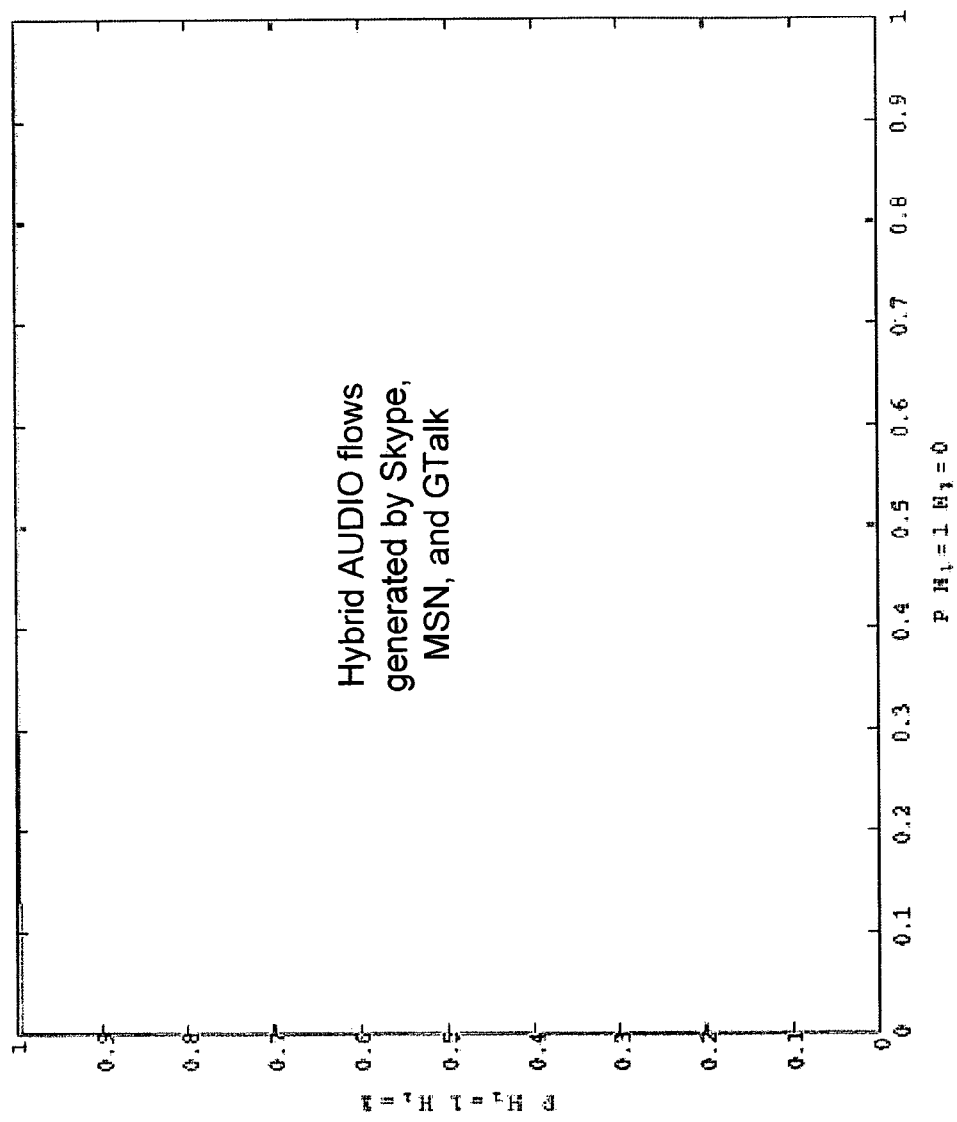
Figure 9C:
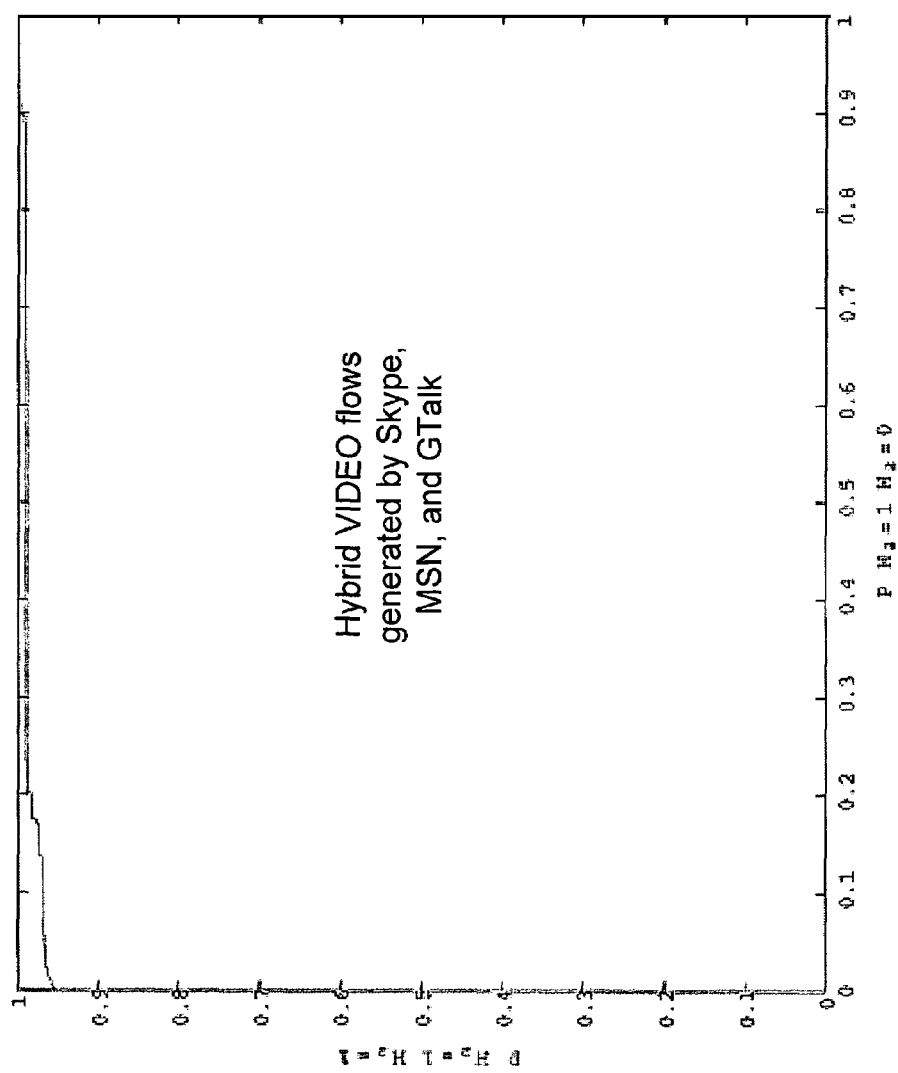

In still another example, experiments on hybrid flows are performed. FIG. 9A-9C show the ROC curves of classifying FILE, AUDIO, and VIDEO flows in hybrid flows from multiple network operators in accordance with one embodiment of the present invention.

To better demonstrate FIGS. 6-9, some typical values of $P_D$ and $P_{FA}$ pairs are shown in Table II below.

TABLE II

Typical $P_D$ and $P_{FA}$ values.

| $P_{FA}$ ($P_D$) | Skype | | Skype + MSN + GTalk | |
|---|---|---|---|---|
| | Single | Hybrid | Single | Hybrid |
| FILE | .039(.989) | .044(.977) | .041(.981) | .039(.967) |
| AUDIO | 0(1) | 0(1) | 0(.995) | .002(.986) |
| VIDEO | 0(.993) | 0(.965) | 0(.952) | 0(.948) |

Figure 10A:
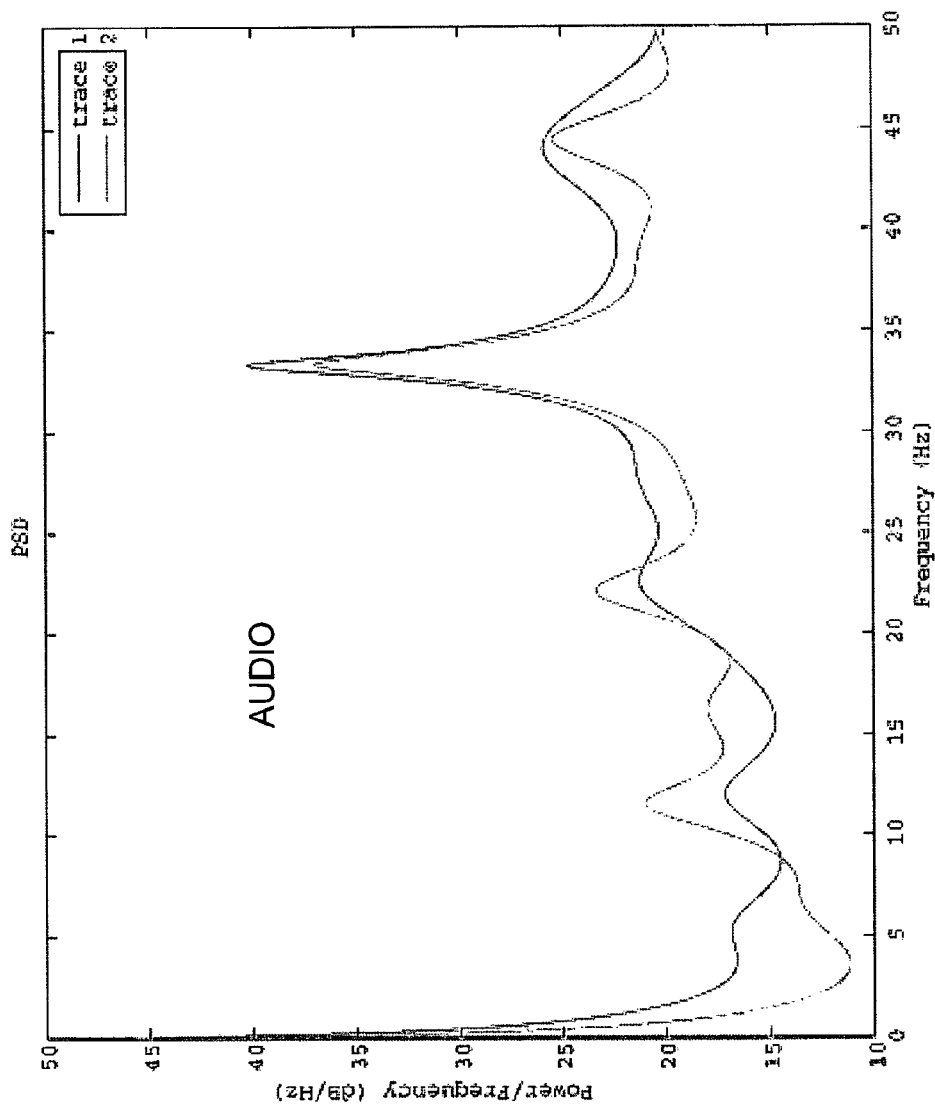
FIG. 10 shows power spectral density of multiple audio and video network traffic flow in accordance with one embodiment of the present invention.
Figure 10B:
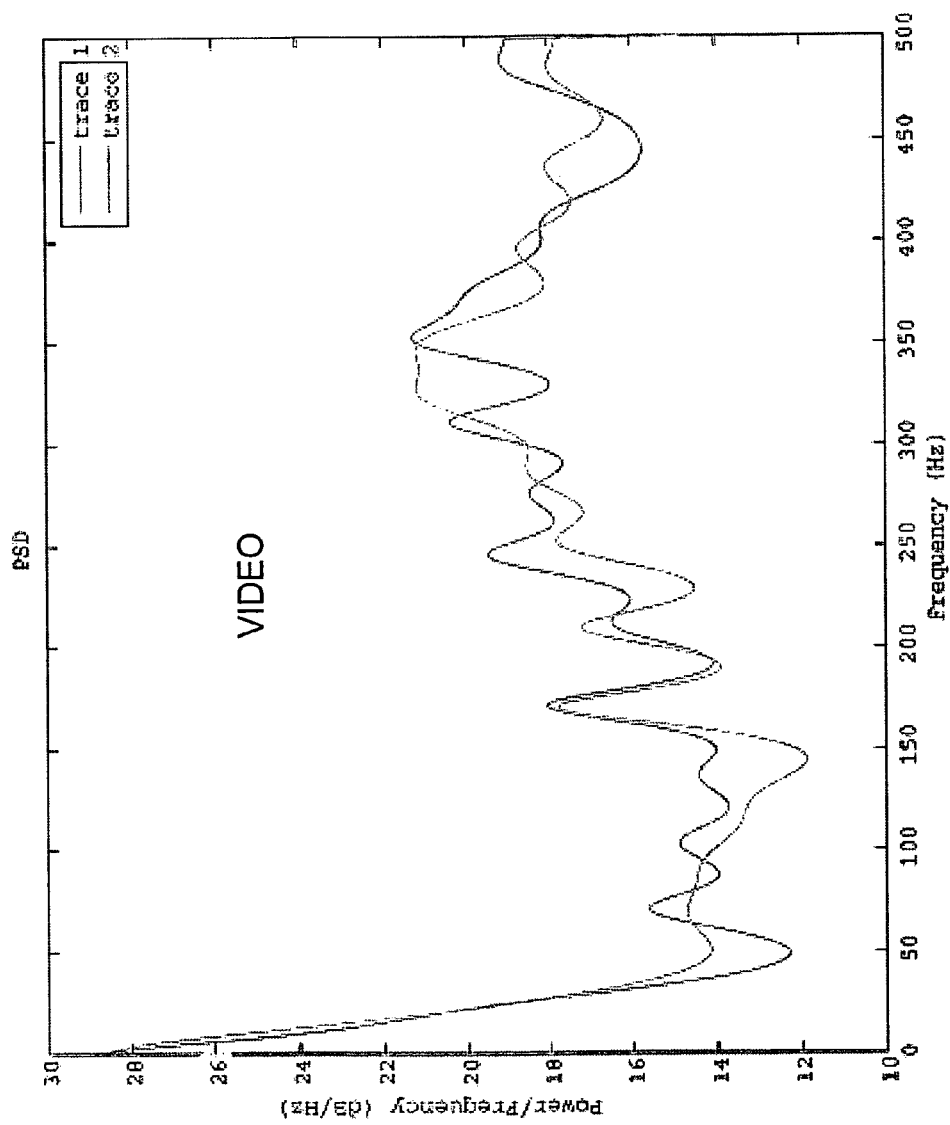

From Table II, one notes that classification of AUDIO traffic is more accurate than that of VIDEO. Specifically, 100% accurate classification of Skype AUDIO flows may be achieved. This is due to the fact that AUDIO traffic has higher regularity than VIDEO does, as shown in FIGS. 10A and 10B, which illustrates the estimated PSD of two independent AUDIO traffic flows and two independent VIDEO traffic flows. One can immediately tell the dominant periodic component at 33 Hz in the AUDIO traffic flows. This frequency corresponds to the 30-millisecond IPD of the employed voice coding.

On the other hand, VIDEO PSDs have peaks at 0. It means that non-periodic component dominates in VIDEO traffic flows. One can see that PSDs of the two VIDEO traffic flows are close to each other. That is the reason that the real time classification methods described above may achieve high classification accuracy by using PSD features.

From Table II, one can tell that classification of single-typed flows is more accurate than that of hybrid flows. Mixing multiple types of traffic together may be equivalent to increasing noise. Hence, it is not surprising that classification accuracy is reduced.

One further notes that classification of Skype flows is more accurate than that of flows generated from general applications, i.e., Skype, MSN, and GTalk. Empirically, it may be found that Skype traffic flows are similar to traffic GTalk flows, but quite different from MSN traffic flows. For example, both Skype and GTalk AUDIO traffic flows have 33-millisecond IAT, whereas MSN AUDIO traffic flow has 25-millisecond IAT. When these flows are mixed together, classification accuracy is reduced. But the accuracy reduction is acceptable. Specifically, for hybrid AUDIO traffic flows at $P_{FA} \approx 0$, $P_D$ is reduced from 1 to 0.986; while for hybrid VIDEO traffic, $P_D$ is reduced from 0.965 to 0.948. This demonstrates that the above described classification method is robust. The robustness results from the fact that the subspace identification module composes multiple subspaces in the original high-dimensional feature space. As a result, PSD feature vectors of Skype and GTalk are likely to be within different subspaces than those of MSN. Therefore, it is still with high probability to make correct classification.

Advantages of the present invention may include one or more of the following. Real-time network traffic flows carrying multiple types of sessions may be classified for the purpose of QoS provision, which is of high interest to network carriers and operators. Network data packet features may be combined with packet arrival time in a novel way to establish a stochastic process model for representing a network flow. Spectral analysis techniques may be applied to this stochastic process model to extract regularities residing in real-time network traffic. Subspace decomposition followed by subspace bases identification provides a more general method for low dimensional subspace identification comparing to prior art method such as principal components analysis. Normalized distance to subspace used as the similarity metric for net work traffic flow classification provides a more general and robust method conventional nearest-neighbor and K-nearest-neighbor methods.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

I claim:

1. A method for classifying a network traffic flow of a network, the method comprising: providing a first subspace, corresponding to a first classification, from a first training traffic flow; representing content independent parameters of the network traffic flow in a stochastic process model, wherein the content independent parameters comprise packet arrival time and packet size of each packet of a plurality of packets in the network traffic flow; extracting, using a computer, a first power spectral density (PSD) feature vector from the network traffic flow according to a spectral analysis of the stochastic process model; measuring, using the computer, a first similarity of the first PSD feature vector with the first subspace according to a first similarity metric; and identifying the first classification of the network traffic flow according to the first similarity wherein providing the first subspace comprises: representing content independent training parameters of the first training traffic flow in another stochastic process model, wherein the content independent training parameters of the first training traffic flow comprise packet arrival time and packet size of each training packet of a plurality of training packets in the first training network traffic flow; extracting using a computer, a plurality of PSD feature vectors from the first training traffic flow according to the spectral analysis of the other stochastic process model; composing the first subspace using the plurality of PSD feature vectors; decomposing the first subspace into one or more segments; and identifying one or more bases each representing a structure of a segment.

2. The method of claim 1, further comprising:
providing a second subspace, corresponding to a second classification, from a second training traffic flow;
measuring a second similarity of the first PSD feature vector with the second subspace according to a second similarity metric; and
identifying the second classification of the network traffic flow according to the second similarity.

3. The method of claim 1 wherein the first subspace is decomposed according to minimizing a coding length of the one or more segments.

4. The method of claim 1 wherein the first similarity is measured by a normalized distance from the first PSD feature vector to the subspace, and wherein the normalized distance is defined according to the one or more bases of the first subspace.

5. The method of claim 1,
wherein the stochastic process model comprises a continuous time stochastic process;
wherein extracting the first power spectral density (PSD) feature vector comprises:
processing the continuous time stochastic process through a low pass filter;
sampling the low pass filtered continuous time stochastic process at a sampling frequency to produce a discrete time sequence; and
extracting the PSD feature vector from a plurality of PSDs estimated from the discrete time sequence.

6. The method of claim 5, wherein the sampling frequency corresponds to a period of substantially 0.5 milliseconds.

7. The method of claim 2, wherein at least one of the first and second classifications is one from the list consisting of audio traffic and video traffic.

8. The method of claim 1, further comprising:
obtaining the first training traffic flow from the network during a training phase prior to a classification phase; and
obtaining the network traffic flow from the network during the classification phase,
wherein the network traffic flow is a hybrid flow comprising a plurality of classifications.

9. The method of claim 1, further comprising:
extracting a sub flow of the network traffic flow according to the packet size of each packet of the plurality of packets in the network traffic flow;
comparing a variance of packet sizes in the sub flow to a predetermined threshold; and
identifying a third classification of the network traffic according to the comparison.

10. The method of claim 9, wherein the third classification is file transfer traffic.

11. A non-transitory computer readable medium, embodying instructions executable by the computer to perform method steps for classifying a network traffic flow of a network, the instructions comprising functionality to: provide a first subspace, corresponding to a first classification, from a first training traffic flow; represent content independent parameters of the network traffic flow in a stochastic process model, wherein the content independent parameters comprise packet arrival time and packet size of each packet of a plurality of packets in the network traffic flow; extract a first power spectral density (PSD) feature vector from the network traffic flow according to a spectral analysis of the stochastic process model; measure a first similarity of the first PSD feature vector with the first subspace according to a first similarity metric; and identify the first classification of the network traffic flow according to the first similarity.

12. The computer readable medium of claim 11, wherein the instructions further comprises functionality to:
provide a second subspace, corresponding to a second classification, from a second training traffic flow;
measure a second similarity of the first PSD feature vector with the second subspace according to a second similarity metric; and
identify the second classification of the network traffic flow according to the second similarity,
wherein at least one of the first and second classifications is one from the list consisting of audio traffic and video traffic.

13. The computer readable medium of claim 12, wherein the instructions further comprises functionalities to:
extract a sub flow of the network traffic flow according to the packet size of each packet of the plurality of packets in the network traffic flow;
compare a variance of packet sizes in the sub flow to a predetermined threshold; and
identify a file transfer traffic classification of the network traffic based on the comparison,
wherein the network traffic flow is a hybrid flow comprising at least two of the first, second, and third classifications.

14. A system for classifying a network traffic flow of a network, comprising:
a subspace identification module configured to provide a first subspace, corresponding to a first classification, from a first training traffic flow;
a power spectral density (PSD) feature extraction module configured to:
represent content independent parameters of the network traffic flow in a stochastic process model, wherein the content independent parameters comprise packet arrival time and packet size of each packet of a plurality of packets in the network traffic flow; and
extract a PSD feature vector from the network traffic flow according to a spectral analysis of the stochastic process model; and
a processor and memory storing instruction when executed by the processor comprising functionalities for
measuring a first similarity of the PSD feature vector with the first subspace according to a first similarity metric; and
identifying the first classification of the network traffic flow according to the first similarity.

15. The system of claim 14,
wherein the subspace identification module is further configured to provide a second subspace, corresponding to a second classification, from a second training traffic flow;
wherein the instructions when executed by the processor further comprising functionalities for:
measuring a second similarity of the PSD feature vector with the second subspace according to a second similarity metric; and
identifying the second classification of the network traffic flow according to the second similarity,
wherein at least one of the first and second classifications is one from the list consisting of audio traffic and video traffic.

16. The system of claim 15, further comprising:
a sub flow extraction module configured to extract a sub flow of the network traffic flow according to the packet size of each packet of the plurality of packets in the network traffic flow; and
a file classifier configured to:
  compare a variance of the packet sizes in the sub flow to a predetermined threshold; and
  identify a file transfer traffic classification of the network traffic based on the comparison,
wherein the network traffic flow is a hybrid flow comprising at least two of the first, second, and third classifications.

* * * * *